US012659024B2

(12) United States Patent
Lyu et al.

(10) Patent No.: US 12,659,024 B2
(45) Date of Patent: Jun. 16, 2026

(54) METHOD FOR WIRELESS COMMUNICATION, TERMINAL DEVICE, AND NETWORK DEVICE

(71) Applicant: QUECTEL WIRELESS SOLUTIONS CO., LTD., Shanghai (CN)

(72) Inventors: Ling Lyu, Shanghai (CN); Zheng Zhao, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 0 days.

(21) Appl. No.: 19/294,954

(22) Filed: Aug. 8, 2025

(65) Prior Publication Data

US 2025/0365066 A1 Nov. 27, 2025

Related U.S. Application Data

(63) Continuation of application No. PCT/CN2023/132838, filed on Nov. 21, 2023.

(51) Int. Cl.
*H04W 36/30* (2009.01)
*H04B 7/185* (2006.01)

(52) U.S. Cl.
CPC ..... *H04B 7/18541* (2013.01); *H04B 7/18547* (2013.01); *H04B 7/18589* (2013.01)

(58) Field of Classification Search
None
See application file for complete search history.

(56) References Cited

U.S. PATENT DOCUMENTS

2015/0271730 A1* 9/2015 Benammar ........ H04B 7/18517
455/436

FOREIGN PATENT DOCUMENTS

CN       112312451 A    2/2021
WO   WO 2022235319 A1   11/2022

OTHER PUBLICATIONS

Office Action in Chinese Appln. No. 202380012333.3, dated Jun. 22, 2024, 18 pages (with English translation).

* cited by examiner

*Primary Examiner* — Gary Lafontant
(74) *Attorney, Agent, or Firm* — Fish & Richardson P.C.

(57) ABSTRACT

Provided are a method for wireless communication, a terminal device, and a network device. One example method includes: receiving a first handover command indicates a terminal device to perform a handover from a first satellite to a second satellite; and detecting a first synchronization signal and a second synchronization signal within a first resource domain and a second resource domain, respectively; wherein the first resource domain and the second resource domain are determined based on first information, the first synchronization signal is associated with the first satellite, and the second synchronization signal is associated with the second satellite.

20 Claims, 3 Drawing Sheets

100

200

300

A terminal device receives a first handover command — S510

The terminal device detects a first synchronization signal within a first resource domain according to first information — S520

1 radio frame=10ms

Half frame=5ms

Slot 0   Slot 1   Slot 2   Slot 3   Slot 4

14 symbol      14 symbol

SSB0   SSB1     SSB2   SSB3

710

720

δ1

δ2

D1

D2

Unchanged PCI

730

810

D

820

Unchanged PCI

830

Terminal device
1000

Receiving unit 1010

Detecting unit 1020

Network device
1100

Sending unit 1110

Apparatus
1200

Processor
1210

Memory
1220

Transceiver
1230

1

METHOD FOR WIRELESS COMMUNICATION, TERMINAL DEVICE, AND NETWORK DEVICE

CROSS-REFERENCE TO RELATED APPLICATIONS

This application is a continuation of International Application No. PCT/CN2023/132838, filed on Nov. 21, 2023, the disclosure of which is hereby incorporated by reference in its entirety.

TECHNICAL FIELD

The present disclosure relates to the field of communication technology and, more particularly, to a method for wireless communication, a terminal device, and a network device.

BACKGROUND

In some scenarios of non terrestrial network (NTN) systems, when a service satellite of a terminal device is changed, a physical cell identifier (PCI) of a serving cell where the terminal device is located remains unchanged. In these scenarios, when the terminal device performs a handover of the service satellite, synchronization signals of different satellites may conflict with each other due to their identical PCIs, thus affecting the handover efficiency.

SUMMARY

The present disclosure provides a method for wireless communication, a terminal device, and a network device. Various aspects of embodiments of the present disclosure are introduced below.

In a first aspect, a method for wireless communication is provided. The method for wireless communication includes: receiving, by a terminal device, a first handover command configured to instruct the terminal device to perform a handover from a first satellite to a second satellite; and detecting, by the terminal device, a first synchronization signal and a second synchronization signal within a first resource domain and a second resource domain, respectively. The first resource domain and the second resource domain are determined based on first information, the first synchronization signal is associated with the first satellite, and the second synchronization signal is configured for synchronization of the terminal device with the second satellite.

In a second aspect, a method for wireless communication is provided. The method for wireless communication includes: sending, by a network device, a first handover command to a terminal device, wherein the first handover command is configured to instruct the terminal device to perform a handover from a first satellite to a second satellite. A second synchronization signal is configured for synchronization of the terminal device with the second satellite, a first synchronization signal is associated with the first satellite, a first resource domain and a second resource domain are configured for the terminal device to detect the first synchronization signal and the second synchronization signal, respectively, and the first resource domain and the second resource domain are determined based on first information.

In a third aspect, a terminal device provided. The terminal device includes a receiving unit and a detecting unit. The receiving unit is configured to receive a first handover command, where the first handover command is configured to instruct the terminal device to perform a handover from a first satellite to a second satellite. The detecting unit is configured to detect a first synchronization signal and a second synchronization signal within a first resource domain and a second resource domain, respectively. The first resource domain and the second resource domain are determined based on first information, the first synchronization signal is associated with the first satellite, and the second synchronization signal is configured for synchronization of the terminal device with the second satellite.

In a fourth aspect, a network device is provided. The network device includes a sending unit. The sending unit is configured to send a first handover command to a terminal device, where the first handover command is configured to instruct the terminal device to perform a handover from a first satellite to a second satellite. A second synchronization signal is configured for synchronization of the terminal device with the second satellite, a first synchronization signal is associated with the first satellite, a first resource domain and a second resource domain are configured for the terminal device to detect the first synchronization signal and the second synchronization signal, respectively, and the first resource domain and the second resource domain are determined based on first information.

In a fifth aspect, a communication apparatus is provided. The communication apparatus includes a memory and a processor, where the memory is configured to store programs, and the processor is configured to call the programs in the memory to perform the method according to the first aspect or the second aspect.

In a sixth aspect, an apparatus is provided. The apparatus includes a processor configured to call programs from a memory to perform the method according to the first aspect or the second aspect.

In a seventh aspect, a chip is provided. The chip includes a processor configured to call programs from a memory to cause a device installed with the chip to perform the method according to the first aspect or the second aspect.

In an eighth aspect, a computer readable storage medium storing programs is provided. The programs are configured to cause a computer to perform the method according to the first aspect or the second aspect.

In a ninth aspect, a computer program product is provided. The computer program product includes programs configured to cause a computer to perform the method according to the first aspect or the second aspect.

In a tenth aspect, a computer program is provided. The computer program is configured to cause a computer to perform the method according to the first aspect or the second aspect.

In the embodiments of the present disclosure, after the first handover command is received by the terminal device, the first resource domain and the second resource domain for detecting the first synchronization signal and the second synchronization signal respectively can be determined based on the first information. The first synchronization signal is associated with the first satellite, and the second synchronization signal is configured for the terminal device to synchronize with the second satellite. Thus, even if the first synchronization signal and the second synchronization signal carry the same PCI, the terminal device can detect synchronization signals from different satellites in different resource domains, respectively, so as to determine the second synchronization signal and perform the handover. Based on the determination of different resource domains, the interference of the first synchronization signal on the handover process can be effectively avoided or mitigated, thereby improving the handover efficiency.

DETAILED DESCRIPTION OF THE EMBODIMENTS

Figure 1:
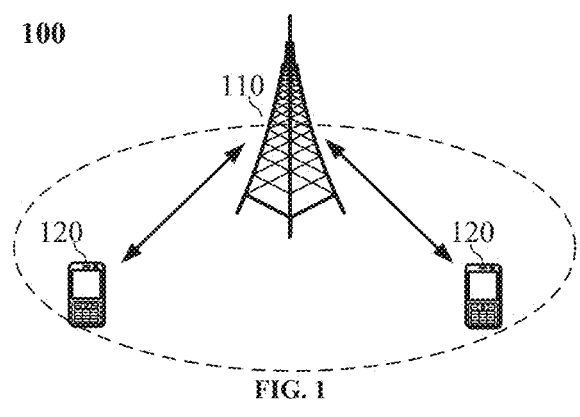
FIG. 1 illustrates a wireless communication system applied in embodiments of the present disclosure.

Technical solutions of the present disclosure are described below in conjunction with the accompanying drawings. For ease of understanding, the terms and communication process involved in the present disclosure are first described below in conjunction with FIGS. 1 to 6. Apparently, the described embodiments are part, but not all, of the embodiments of the present disclosure. With respect to the embodiments in the present disclosure, all other embodiments obtained by a person of ordinary skill in the art without making creative labor fall within the scope of protection of the present disclosure.

The embodiments of the present disclosures may be applied to various communication systems. For example, the embodiments of the present disclosure may be applied to a global system of mobile communication (GSM), a code division multiple access (CDMA) system, a wideband code division multiple access (WCDMA) system, a general packet radio service (GPRS) system, a long term evolution (LTE) system, an advanced long term evolution (LTE-A) system, a new radio (NR) system, an evolved system of the NR system, an LTE-based access to unlicensed spectrum (LTE-U) system, an NR-based access to unlicensed spectrum (NR-U) system, a universal mobile telecommunication system (UMTS), wireless local area networks (WLAN), wireless fidelity (WiFi), and a 5th-generation communication (5G) system. The embodiments of the present disclosure may also be applied to other communication systems, such as a future communication system. For example, the future communication system may be a 6th-generation (6G) mobile communication system, a satellite communication system, or the like.

A traditional communication system supports a limited number of connections and is easy to implement. However, with the development of communication technology, the communication system can support not only traditional cellular communications, but also one or more other types of communications. For example, the communication system may support at least one of the following communications: device to device (D2D) communication, machine to machine (M2M) communication, machine type communication (MTC), enhanced MTC (eMTC), vehicle to vehicle (V2V) communication, vehicle to everything (V2X) communication, and the like. The embodiments of the present disclosure may also be applied to a communication system supporting the above communications.

The communication system in the embodiments of the present disclosure may be applied in a carrier aggregation (CA) scenario, a dual connectivity (DC) scenario, and a standalone (SA) network deployment scenario.

The communication system in the embodiments of the present disclosure may be applied to unlicensed spectrum. The unlicensed spectrum may also be considered as shared spectrum. Alternatively, the communication system in the embodiments of the present disclosure may be applied to licensed spectrum. The licensed spectrum may also be considered as dedicated spectrum.

The embodiments of the present disclosure may be applied to a terrestrial network (TN) system, or may be applied to an NTN system. As an example, the NTN system may include a 4G-based NTN system, a NR-based NTN system, an internet of things (IoT) based NTN system, and a narrow band internet of things (NB-IoT) based NTN system.

The communication system may include at least one terminal device. The terminal device referred to in the embodiments of the present disclosure may also be referred to as a user equipment (UE), an access terminal, a user unit, a subscriber station, a mobile station, a mobile station (MS), a mobile Terminal (MT), a remote station, a remote terminal, a mobile device, a user terminal, a terminal, a wireless communication apparatus, a user agent, a user device, or the like.

In some embodiments, the terminal device may be a station (ST) in a WLAN. In some embodiments, the terminal device may be a cellular phone, a cordless phone, a session initiation protocol (SIP) phone, a wireless local loop (WLL) station, a personal digital assistant (PDA) device, a handheld device with wireless communication capability, a computing device or an other processing device connected to a wireless modem, an in-vehicle device, a wearable device, a terminal device in a next-generation communication system (e.g., an NR system), a terminal device in a public land mobile network (PLMN) evolved in the future, or the like.

In some embodiments, the terminal device may be a device that provides voice and/or data connectivity to a user. For example, the terminal device may be a handheld device with wireless connectivity, an in-vehicle device, or the like. In some examples, the terminal device may be a mobile phone, a Pad, a laptop computer, a handheld computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in smart grid, a wireless terminal in transportation safety, a wireless terminal in smart city, a wireless terminal in smart home, or the like.

In some embodiments, the terminal device may be deployed on land. For example, the terminal device may be deployed indoors or outdoors. In some embodiments, the terminal device may be deployed on water, such as on a ship. In some embodiments, the terminal device may be deployed in the air, such as on an aircraft, a balloon, or a satellite.

In addition to the terminal device, the communication system may include at least one network device. The network device in the embodiments of the present disclosure may be a device that communicates with the terminal device, and may also be referred to as an access network device or a wireless access network device. The network device may for example be a base station. The network device in the embodiments of the present disclosure may refer to a radio access network (RAN) node (or device) that accesses the terminal device to a wireless network. A base station may broadly cover various names in the following, or be substituted with names such as: node B (NodeB), evolved NodeB (eNB), next generation NodeB (gNB), relay station, access point, transmitting and receiving point (TRP), transmitting point (TP), master station (MeNB), secondary station (SeNB), multi-standard radio (MSR) node, home base station, network controller, access node, wireless node, access point (AP), transmission node, transceiver node, base band unit (BBU), remote radio unit (RRU), active antenna unit (AAU), remote radio head (RRH), central unit (CU), distributed unit (DU), positioning node and so on. The base station may be a macro base station, a micro base station, a relay node, a donor node or the like, or a combination thereof. The base station may also refer to a communication module, modem or chip disposed within the aforementioned equipment or device. The base station may also be a device that assumes the function of a base station in a mobile switching center and D2D, V2X, or M2M communication, a network-side device in a 6G network, a device that assumes the function of a base station in a future communication system, or the like. The base station may support networks of the same or different access technologies. The embodiments of the present disclosure do not limit the adopted specific technology and specific device form of the network device.

The base station may be stationary or mobile. For example, a helicopter or unmanned aerial vehicle may be configured to serve as a mobile base station, and at least one cell may move depending on the location of the mobile base station. In other examples, the helicopter or unmanned aerial vehicle may be configured to serve as a device to communicate with another base station.

In some deployments, the network device in the embodiments of the present disclosure may refer to a CU or a DU, or the network device includes a CU and a DU. The gNB may also include an AAU.

By way of example and not limitation, in the embodiments of the present disclosure, the network device may have mobile characteristics. For example, the network device may be a mobile device. In some embodiments of the present disclosure, the network device may be a satellite, or a balloon station. In some embodiments of the present disclosure, the network device may be a base station disposed in a location on land, water, or the like.

In some embodiments of the present disclosure, the network device may provide services for a cell, and the terminal device communicates with the network device through transmission resources (e.g., frequency-domain resources, or spectrum resources) configured by the cell which may be a cell corresponding to the network device (e.g., a base station). The cell may belong to a macro base station, or may belong to a base station corresponding to a small cell. The small cell may include: a metro cell, a micro cell, a pico cell, a femto cell, and the like, which feature a small coverage area and a low transmit power, and are suitable for providing service of data transmission with a high-speed rate.

Exemplarily, FIG. 1 is a schematic diagram illustrating an architecture of a communication system according to embodiments of the present disclosure. As shown in FIG. 1, the communication system 100 may include a network device 110. The network device 110 may be a device that communicates with a terminal device 120 (or known as a communication terminal). The network device 110 may provide communication coverage for a specific geographic area and may communicate with a terminal device located within that coverage area.

FIG. 1 exemplarily illustrates one network device and two terminal devices. In some embodiments of the present disclosure, the communication system 100 may include a plurality of network devices, and may include other numbers of terminal devices within the coverage area of each of the plurality of the network devices, which is not limited by the embodiments the present disclosure.

Figure 2:
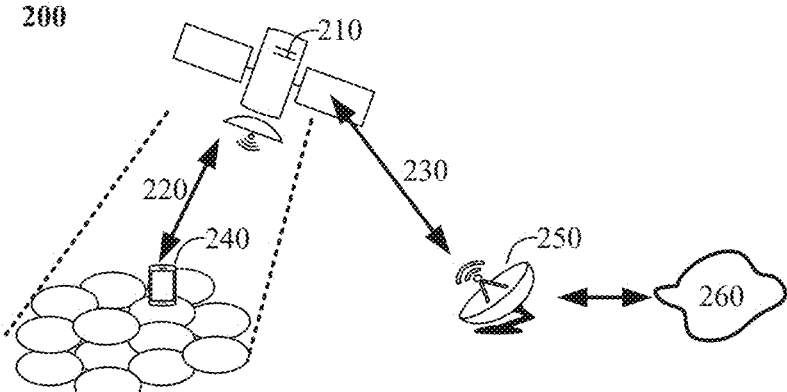
FIG. 2 illustrates an NTN system applied in embodiments of the present disclosure.

Exemplarily, FIG. 2 is a schematic diagram illustrating an architecture of the NTN system mentioned above. The NTN system 200 shown in FIG. 2 uses a satellite 210 as an airborne platform. As shown in FIG. 2, the satellite radio access network includes a satellite 210, a service link 220, a feeder link 230, a terminal device 240, a gateway (GW) 250, and a network 260. The network 260 include a base station and a core network.

The satellite 210 is a spacecraft based on a space platform. The service link 220 refers to a link between the satellite 210 and the terminal device 240. The feeder link 230 refers to a link between the gateway 250 and the satellite 210. The earth-based gateway 250 connects the satellite 210 to the base station or core network, depending on the choice of architecture.

The NTN architecture shown in FIG. 2 is a bent-pipe transponder architecture. In this architecture, the base station is located on earth behind the gateway 250, and the satellite 210 acts as a relay. The satellite 210 operates as a relay that forwards signals from the feeder link 230 to the service link 220, or forwards signals from the service link 220 to the feeder link 230. That is, the satellite 210 does not function as a base station, and communications between the terminal device 240 and the base station in the network 260 can be relayed through the satellite 210.

Figure 3:
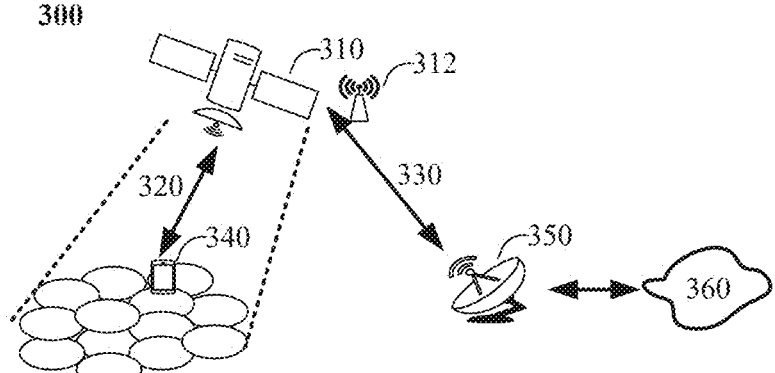
FIG. 3 illustrates another NTN system applied in embodiments of the present disclosure.

Exemplarily, FIG. 3 is a schematic diagram illustrating another architecture of the NTN system. As shown in FIG. 3, the satellite radio access network 300 includes a satellite 310, a service link 320, a feeder link 330, a terminal device 340, a gateway 350, and a network 360. Unlike FIG. 2, the satellite 310 has a base station 312, and the network 360 behind the gateway 350 includes only a core network.

The NTN architecture shown in FIG. 3 is a regenerative transponder architecture. In this architecture, the satellite 310 carries the base station 312 that can be directly connected to the earth-based core network via the link. The satellite 310 functions as a base station, and the terminal device 340 can communicate directly with the satellite 310. Thus, the satellite 310 may be referred to as a network device.

In the communication system with the architecture shown in FIGS. 2 and 3, a plurality of network devices may be included, and other numbers of terminal devices may be included within the coverage area of each network device, which is not limited in the embodiments of the present disclosure.

In the embodiments of the present disclosure, any of the communication systems shown in FIGS. 1 to 3 may further include other network entities such as a mobility management entity (MME), an access and mobility management function (AMF), and the like, which is not limited in the embodiments of the present disclosure.

It should be understood that devices in the network/system having the communication function in the embodiments of the present disclosure may be referred to as communication apparatuses. Taking the communication system 100 illustrated in FIG. 1 as an example, the communication apparatuses may include the network device 110 and the terminal device 120 having the communication function, and the network device 110 and the terminal device 120 may be specific devices as described above, which are not be repeated herein. The communication apparatus may further include other devices in the communication system 100, such as a network controller, a mobile management entity, and other network entities, which are not limited in the embodiments of the present disclosures.

In order to facilitate understanding, some relevant technical knowledge involved in the embodiments of the present disclosure is first introduced. The following related technologies may be arbitrarily combined with the technical solutions of the present disclosure as optional solutions, all of which fall within the scope of protection of the present disclosure. The embodiments of the present disclosure include at least some of the following.

As communication technologies evolve, the communication system (e.g., 5G) will integrate the market potential of satellite and terrestrial network infrastructures. For example, 5G standards make NTN including satellite segments be part of the recognized 3rd generation partnership project (3GPP) 5G connectivity infrastructure.

The NTN refers to a network or a network segment that uses radio frequency (RF) resources on a satellite or an unmanned aerial system (UAS) platform. Taking satellites as an example, communication satellites are divided into low earth orbit (LEO) satellites, medium earth orbit (MEO) satellites, geostationary earth orbit (GEO) satellites, high elliptical orbit (HEO) satellites, and the like according to their orbital altitudes. LEO is an earth-centered orbit with an altitude of 2,000 kilometers or less, or at least 11.25 periods per day, and an eccentricity of less than 0.25. Most man-made objects in outer space are located in the LEO. The LEO satellites orbit the Earth at high speeds (mobility), but in predictable or deterministic orbits.

Satellites with different orbital altitudes have different orbital periods.

LEO: a typical altitude is 250 kilometers to 1500 kilometers, and an orbital periodicity is 90 minutes to 120 minutes.

MEO: a typical altitude is 5,000 kilometers to 25,000 kilometers, and an orbital periodicity is 3 hours to 15 hours.

GEO: an altitude is about 35,786 kilometers, and an orbital periodicity is 24 hours.

As can be seen from FIGS. 2 and 3 with the satellite as an example, typical scenarios of the NTN systems with access to the terminal device involve NTN transparent payloads or NTN regenerative payloads. In particular, the bent-pipe transponder architecture shown in FIG. 2 corresponds to an NTN transparent payload, and the regenerative transponder architecture shown in FIG. 3 corresponds to an NTN regenerative payload.

In the NTN system, either the satellite or the UAS is highly mobile. A cell projected to the ground by the satellite may be fixed with respect to the ground, or may be movable with the satellite. Taking serving cells corresponding to the LEO satellites as an example, the cells projected to the ground by the LEO satellites usually include two types: quasi-terrestrial fixed cell and quasi-terrestrial moving cell.

A cell that is stationary with respect to the ground may refer to a serving cell that is fixed in the geographic area covered. For example, different LEO satellites complete the coverage of the same area on the ground by adjusting antenna pointing angles. In response to a LEO satellite being unable to cover the area, the LEO satellite is replaced by another LEO satellite. For a satellite located in geosynchronous orbit (GSO), a cell projected to the ground by the satellite can be a fixed cell. For a satellite in non-geosynchronous orbit (NGSO), the fixed cell can be served by multiple satellites with alternating coverage.

For a quasi-terrestrial fixed cell, the network (NW) may indicate, via traffic service time (T-service), time information about when the cell according to the NTN quasi-geo-fixed system ceases providing service to its current coverage area. This service time may be configured for the terminal device to start searching for a suitable cell before leaving the current cell to ensure service continuity. Exemplarily, the terminal device may perform the cell search after the start of the T-service and complete the cell handover or cell reselection before the expiration of the T-service.

In some scenarios of quasi-terrestrial fixed cells, when the service satellite corresponding to the serving cell changes, the PCI of the serving cell may be unchanged. Exemplarily, when the service satellite corresponding to the serving cell is switched from satellite 1 to satellite 2, the PCI remains unchanged since the ground station providing the service remains unchanged. Exemplarily, even if the satellite connected to the network device (e.g., gNB) changes, the network device can serve the same area, and therefore the PCI is unchanged within that area.

In a terrestrial network, the communication system (e.g., NR) cannot assign the same PCI to neighbouring cells. If neighbouring cells are assigned the same PCI, the terminal device can only synchronize one of the neighbouring cells when performing a search process for the initial cell such as cell handover or cell reselection in the overlapping area. However, that cell may not be the most suitable cell, and the terminal device may also conflict (interfere) during the search process due to the same PCI. Therefore, it is necessary to avoid neighbouring cells having the same PCI to improve the handover efficiency of the terminal device.

However, as mentioned above, the scenario of unchanged PCI may occur in NTN networks. Therefore, compared with terrestrial cellular networks such as NR, NTN systems need to support a handover with unchanged PCI. That is, in the handover with unchanged PCI, the NTN systems need to consider how to solve the problem that the terminal device conflicts (interferes) during the search process due to the same PCI.

In view of this problem, a handover scenario in an NTN system is first analyzed specifically. As mentioned above, the communication links in the NTN system include the service link and the feeder link. For different links, a handover with unchanged PCI mainly includes service link handover and feeder link handover. The service link handover corresponds to a handover of a link between the terminal device and the service satellite, and the feeder link handover corresponds to a handover of a link between the satellite and the gateway.

The feeder link handover involves soft feeder link handover and hard feeder link handover. In the soft feeder link handover, the NTN payload can be connected to more than one NTN gateway in a given time period. Communications between the satellite and different gateways can ensure temporary overlap during the feeder link handover. In the hard feeder link handover, the NTN payload is connected to only one NTN gateway at any given time, and therefore, a handover between feeder links may result in radio link interruption.

For the service link handover, the same soft and hard handover scenarios exist. From the perspective of the terminal device or serving cell, the criterion for distinguishing between "soft" and "hard" is whether the next satellite provides coverage before the coverage of previous satellite is lost. Taking a terminal device as an example, in the hard handover scenario, the terminal device is connected to only one satellite at a time. In the soft handover scenario, the terminal device is connected to more than one satellite at the same time.

Figure 4:
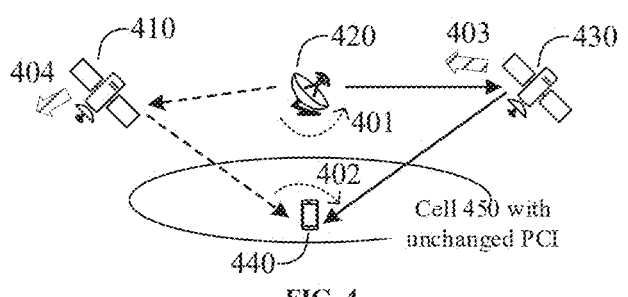
FIG. 4 is a schematic diagram illustrating a handover of a satellite with unchanged PCI in an NTN system.

For ease of understanding, the satellite handover mode with unchanged PCI is schematically illustrated below in conjunction with FIG. 4. Referring to FIG. 4, a satellite 410 is moving at a speed 404, and a satellite 430 is moving at a speed 403. Both the satellites can serve the same area (cell 450). The cell 450 is a fixed cell with unchanged PCI. According to the direction of the two speeds, the satellite 410 is a source satellite (old satellite), and the satellite 430 is a target satellite (new satellite).

As can be seen from FIG. 4, as the two satellites move, the satellite 430 will be connected to the gateway 420 after the satellite 410. Therefore, a feeder link handover 401 needs to be performed between the gateway 420 and the two satellites. If the gateway 420 cannot be connected to both the satellite 410 and the satellite 420, the feeder link handover 401 is a hard handover. If the gateway 420 can be connected to both the satellite 410 and the satellite 420, the feeder link handover 401 may be a soft handover.

With continued reference to FIG. 4, the satellite 410 and the satellite 430 will sequentially cover the cell 450 with an unchanged PCI. Therefore, the terminal device 440 in the cell 450 needs to perform a service link handover 402 from the satellite 410 to the satellite 430. If the terminal device 440 cannot be connected to both the satellite 410 and the satellite 420, the service link handover 402 is a hard handover. If the terminal device 440 can be connected to both the satellite 410 and the satellite 420, the service link handover 402 may be a soft handover.

The soft handover and hard handover are described above in conjunction with FIG. 4. For the fixed cell in FIG. 4, in the hard handover scenario, the interference problem described above may not exist in the case of the PCI unchanged since the terminal device does not receive signals from the two satellites at the same time. However, during a coverage overlapping duration of soft handover, the terminal device may detect multiple synchronization signals with the same PCI, resulting in conflicts and reduced handover efficiency.

Taking a synchronization signal being a synchronization signal block (SSB) as an example, the above problem is specified below in conjunction with the service link handover. In the embodiments of the present disclosure, the SSB may also denote a synchronization signal/physical broadcast channel signal block (SS/PBCH block, SSB). That is, the SSB in the embodiments of the present disclosure may be replaced with the SS/PBCH block.

In the service link handover, when the service satellite of the terminal device is switched from a source satellite to a target satellite, the terminal device needs to synchronize with a downlink (DL) of the target satellite to perform a handover to the target satellite. In order to perform synchronization with the target satellite, the terminal device needs to detect the SSB associated with the target satellite.

Exemplarily, the terminal device may detect the SSB based on an SSB measurement timing configuration (SMTC), which is an SSB-based measurement timing configuration introduced in 5G NR.

In the 5G NR, SSB pulses consist of multiple SSBs. The multiple SSBs are associated with different SSB indexes. Further, like a channel state information reference signal (CSI-RS), the SSBs may also be configured for beam management and measurement of different transmission beams. The measurement process of the SSB or the CSI-RS is a power consumption process of the terminal device. In order to reduce the power consumption of the terminal device, the SMTC is introduced. The SMTC defines a duration and periodicity for which the terminal device performs measurements on a particular resource. During the periodicity of the SMTC, the terminal device performs wireless link monitoring/wireless resource management measurement on the configured SSB or CSI-RS.

Exemplarily, when the terminal device receives and applies at least one SMTC, information of the SMTC may include a periodicity and/or offset and/or duration of a measurement window. The terminal device may receive the information of SMTC information from system information of the serving cell in an idle/inactive state, or receive information of the SMTC from a radio resource control (RRC) release message when transitioning to the idle/inactive state from a connected state to the idle/inactive state. The terminal device may receive and measure SSBs within the window of the SMTC for processes such as cell reselection.

Back to the NTN system, in the soft handover scenario, the source and target satellites provide services to the terminal device in the serving cell at the same time, so the terminal device may receive SSBs from the source satellite and SSBs from the target satellite during the SMTC.

Since the PCI of the serving cell is unchanged, the terminal device cannot distinguish whether the received synchronization signal is from the source satellite or from the target satellite, and therefore cannot synchronize with the target satellite via the SSB of the target satellite. In other words, the synchronization signals with the same PCI sent by the source and target satellites may interfere with the terminal device's synchronization with the target satellite, thereby affecting the terminal device's handover efficiency from the source satellite to the target satellite.

It is to be noted that the above-mentioned problem of low handover efficiency caused by mutual interference of synchronization signals detected by the terminal device due to the same PCI in the NTN system is only an example, and embodiments of the present disclosure may be applied to any type of scenario in which the communication of the terminal device with different satellites is affected due to the same PCI.

Based on this, embodiments of the present disclosure provide a method for wireless communication. By this method, the terminal device can detect synchronization signals from a first satellite and a second satellite in a first resource domain and a second resource domain, respectively, thereby ensuring that synchronization signals sent by two satellites with the same PCI on the terminal device side do not conflict with each other, thereby improving the handover efficiency. For ease of understanding, the method provided in the embodiments of the present disclosure is described in detail below with reference to FIG. 5.

Figures 5, 6, 7, 8:
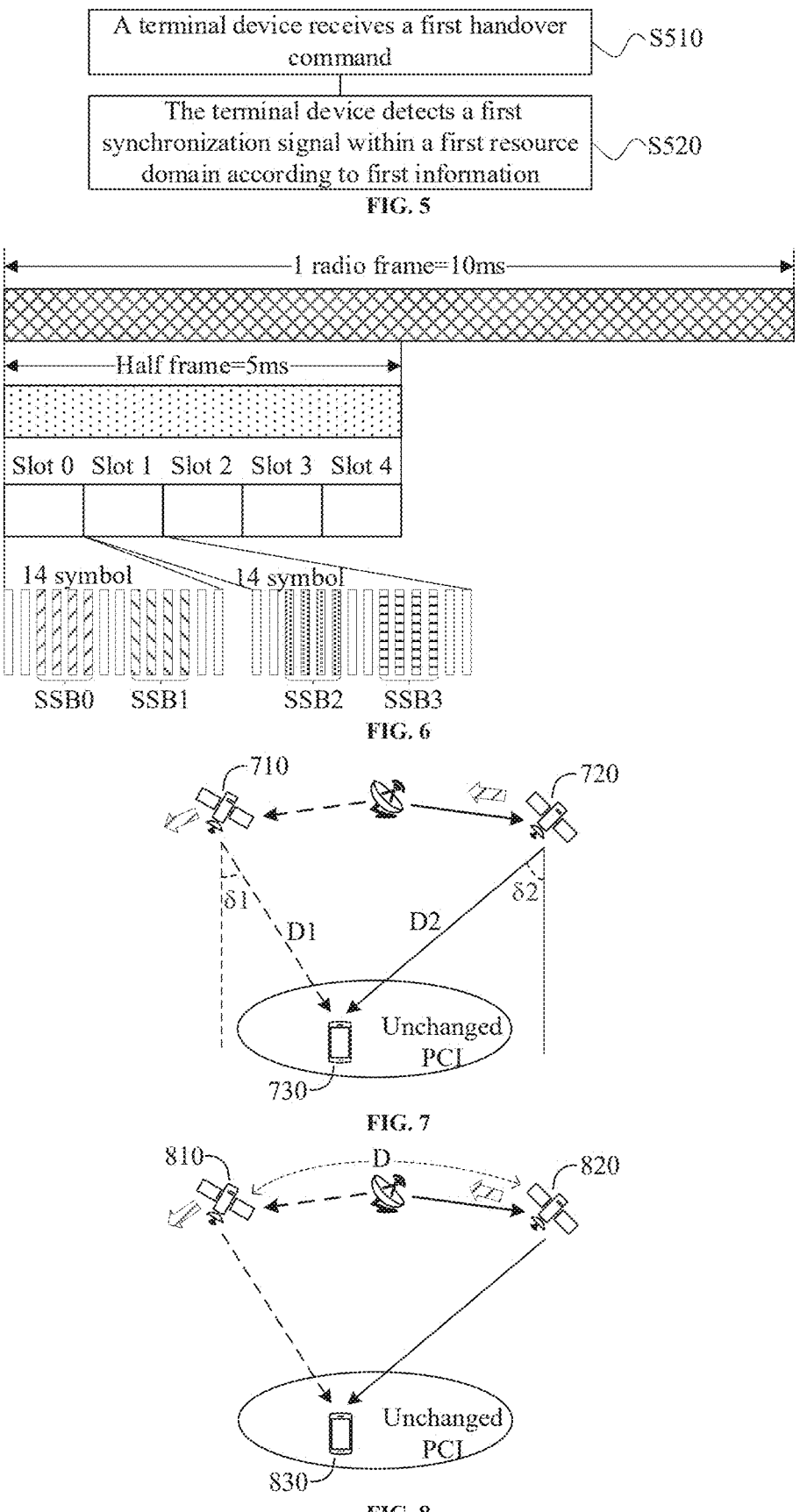
FIG. 5 is a flow chart of a method for wireless communication according to embodiments of the present disclosure.
FIG. 6 is a schematic diagram illustrating time-domain position of a synchronization signal.
FIG. 7 is a schematic diagram illustrating one possible implementation of determining a first offset.
FIG. 8 is a schematic diagram illustrating another possible implementation of determining the first offset.

Referring to FIG. 5, at operation S510, the terminal device receives a first handover command.

The terminal device is any of the terminal devices described above. In some embodiments, the terminal device is a user equipment in a quasi-terrestrial fixed cell of an NTN system. In some embodiments, the terminal device is a communication apparatus that supports NTN features in both GSO and NGSO scenarios. For example, the terminal device supports mobility in both the GSO and NGSO scenarios.

The first handover command is configured to instruct the terminal device to perform a handover from a first satellite to a second satellite. The first handover command may also be referred to as a first handover indication. For example, the first handover command may instruct the terminal device to synchronize with the second satellite.

In some embodiments, the synchronization of the terminal device with the second satellite may include at least one of downlink synchronization, uplink (UL) synchronization, and service link synchronization. As an example, the first handover command may instruct the terminal device to perform downlink synchronization with the second satellite.

The first satellite and the second satellite are two service satellites sequentially connected to the terminal device. In other words, the first satellite and the second satellite are two service satellites that sequentially cover a serving cell where the terminal device is located and provide services. Each service satellite may be any of satellites that provide communication services for the terminal device or the serving cell in which the terminal device is located. In some embodiments, the terminal device may communicate with the service satellite over a service link.

The first satellite is a service satellite that provides service at the current time instant, and thus may also be referred to as a source satellite or a source NTN. The second satellite is a service satellite that provides service after the first satellite, and thus may also be referred to as a target satellite or a target NTN.

The first satellite and the second satellite may be any two of the satellites described above. In some embodiments, the first satellite and the second satellite may be satellites that move at similar satellite orbits or the same orbital altitude. For example, the first satellite and the second satellite are both LEO satellites. In some embodiments, the first satellite and the second satellite may be satellites that move at different satellite orbits or different orbital altitudes.

In some embodiments, the second satellite may be at least one target satellite that is about to provide services to the terminal device. For example, the second satellite may include 1 or 2 target satellites.

As an example, the terminal device may perform a handover from the first satellite to a target satellite.

As an example, the terminal device may perform a handover from the first satellite to a plurality of target satellites to improve handover efficiency. For example, the terminal device may select a target satellite with the strongest synchronization signal among multiple synchronization signals from the target satellites as the next service satellite, so that communication quality after the handover can be ensured.

The handover from the first satellite to the second satellite may also be referred to as satellite handover or service satellite handover. The handover may be a service link handover or a feeder link handover. Exemplarily, as the service satellite of the terminal device is switched from the first satellite to the second satellite, the service link of the terminal device connected to the first satellite is switched to the service link of the terminal device connected to the second satellite. Exemplarily, when the first and second satellites are connected to the same terrestrial gateway, as a result of a handover of the service satellite from the first satellite to the second satellite, the feeder link of the gateway connected to the first satellite is switched to the feeder link of the gateway connected to the second satellite.

It should be understood that the embodiments of the present disclosures can be applied regardless of whether the first and second satellites are connected to the same terrestrial gateway, as long as the service satellite of the terminal device is switched from the first satellite to the second satellite.

In some embodiments, the handover from the first satellite to the second satellite may be a soft handover. During this handover, the first satellite and the second satellite provide services to the terminal device at the same time to avoid link interruption. That is, the terminal device may perform the handover within a coverage overlapping duration of the two satellites. In the coverage overlapping duration, the terminal device may receive a first synchronization signal from the second satellite and establish a connection with the second satellite. For example, the terminal device may perform downlink synchronization with the second satellite before the start of the T-service of the first satellite or before the expiry of the T-service.

In some embodiments, the handover from the first satellite to the second satellite may be a hard handover. During this handover, the terminal device starts establishing a connection with the second satellite only when the first satellite is out of service. For example, the terminal device may perform downlink synchronization with the second satellite when the T-service of the first satellite expires.

As an embodiment, the second satellite sends the synchronization signal without taking into account the timing of the first satellite sending the synchronization signal, since there is no interference problem in the case of hard handover from the first satellite to the second satellite. Exemplarily, the second satellite does not need to be limited to sending the SSBs at a timing different from a timing of the SSBs sent by the first satellite. Also, the second satellite may not be configured with a time offset/SMTC. In such a scenario, the terminal device may autonomously estimate a time window of the SSBs provided by the second satellite based on information of the first and second satellites such as ephemeris and common timing advance (TA).

In some embodiments, the handover of the terminal device from the first satellite to the second satellite may be random access channel (RACH)-based handover or RACH-free handover, which is not limited herein.

In some embodiments, the PCI of the serving cell in which the terminal device is located remains unchanged when the terminal device performs the handover from the first satellite to the second satellite.

Exemplarily, when the first satellite and the second satellite are connected to the same network device, the PCI of the serving cell is also unchanged because the network device providing the service is unchanged. Taking FIG. 4 as an example, the satellite 410 is the first satellite, the satellite 430 is the second satellite, the first satellite and the second satellite are connected to the gateway 420 in turn, and the PCI of the cell covered by the two satellites remains unchanged.

Exemplarily, when the first satellite and the second satellite are connected to different network devices, the PCI of the serving cell where the terminal device is located may also be unchanged.

In some embodiments, when performing a soft handover, the network device configures an information field indicating whether the handover with the unchanged PCI is supported. The indication information may be broadcast information or proprietary information. The broadcast information may be carried via a system information block (SIB) message.

The terminal device receives the first handover command from the network device. Exemplarily, if the current service satellite of the terminal device will no longer be able to provide service, the network device may send the first handover command in advance via broadcast to the terminal device and to the serving cell in which the terminal device is located.

The network device may be a communication apparatus that provides service to the serving cell via the first satellite. For example, the network device is a terrestrial network device connected to the first satellite. As another example, the network device is a network device carried by the first satellite itself. In this scenario, the first satellite may also be referred to as a network device.

In some embodiments, the network device may send the first handover command to the terminal device via the first satellite. As an embodiment, when the first satellite and the second satellite are connected to the same network device, the network device sends the first handover command to the terminal device. As an embodiment, when the first satellite and the second satellite are connected to different network devices, the network device connected to the first satellite is a source network device, and the network device connected to the second satellite is a target network device. Before the handover, the terminal device has not yet established synchronization with the second satellite, and the network device sending the first handover command is the source network device.

It is noted that the network devices connected to the first and second satellites may be any or more of the network devices described above, which is not limited herein.

In some embodiments, the network device may assist the terminal device in avoiding or mitigating interference during the handover. That is, interference between the first and second satellites can potentially be avoided or mitigated by the gNB, which is described in detail below in connection with assistance information associated with the second satellite.

As an example, when the first and second satellites are connected to the same network device, the network device may coordinate resources of the two satellites for sending synchronization signals to resolve possible conflicts. For example, the network device may configure that when the first satellite and the second satellite are connected to the terminal device, the first satellite and the second satellite cannot send the same SSB or cannot have the same SSB index to avoid conflicts. As an implementation, the second satellite may be configured with an SSB index that is different from an SSB index of the first satellite, and information of the SSB index of the second satellite is sent down via a broadcast message of the first satellite.

As an example, the network device may send assistance information for handover to the terminal device to ensure that synchronization signals with the same PCI on the terminal device side do not conflict. For example, the network device may send relevant information for handover to the terminal device upon detection of the second satellite by the first satellite.

As an example, to avoid possible collisions between the two satellites, the network device may configure the first satellite and the second satellite to send SSBs on different resources. For example, the network device may configure different time windows for the SSBs sent by the second satellite and the first satellite.

The network device may send the first handover command to the terminal device in a variety of ways. Exemplarily, the first handover command may be included in a system message. Exemplarily, the first handover command may be included in dedicated signaling.

The first handover command may include handover indication information, and may further include a variety of other information for handover. For example, the first handover command may include second information. The second information may instruct the network device to support a handover with the unchanged PCI of the serving cell. For example, the first handover command may also include timing information related to handover for the terminal device, to enable the terminal device to perform synchronization with the second satellite in a timely manner, thereby improving the handover efficiency.

In some embodiments, the first handover command may include a first time point at which the first satellite ceases services and a second time point at which the terminal device initiates synchronization with the second satellite. When the second time point precedes the first time point, the handover is a soft handover, and when the second time point does not precede the first time point, the handover is a hard handover. Exemplarily, if the second time point precedes the first time point, the terminal device may perform the handover from the first satellite to the second satellite within a time interval between the second time point and the first time point. The handover is a soft handover within a coverage overlapping duration of the first satellite and the second satellite.

As an example, the first time point may be the aforementioned T-service. As previously described, upon expiration of the T-service, the first satellite ceases providing services to the terminal device or the serving cell in which the terminal device is located.

As an example, the second time point is the earliest time instant at which the terminal device can initiate synchronization with the second satellite. This earliest time instant may be referred to as synchronization initiation time of the terminal device with the second satellite. The second time point may be denoted as T-start. That is, at the T-start, the second satellite begins providing services to the serving cell.

As an implementation, in a soft handover scenario of the satellite, the terminal device may initiate synchronization with the second satellite before the T-service of the first satellite. That is, the T-start of the second satellite precedes the T-service of the first satellite. Between the T-start and the T-service, the terminal device may determine, on its own, a time point at which the terminal device initiates synchronization.

In some embodiments, the T-start may be carried in SIB information for the terminal device to obtain in time.

At operation S520, the terminal device detects a first synchronization signal and a second synchronization signal within a first resource domain and a second resource domain, respectively, based on the first information.

In some embodiments, the first information directly indicates the first resource domain and the second resource domain. The terminal device may detect the first synchronization signal within the first resource domain and the second synchronization signal within the second resource domain.

In some embodiments, the terminal device may determine the first resource domain and the second resource domain based on the first information. Further, the terminal device may detect the first synchronization signal within the first resource domain and detect the second synchronization signal within the second resource domain.

The first synchronization signal being associated with the first satellite may indicate that the first synchronization signal is a synchronization signal sent by the first satellite. That is, the first synchronization signal includes all synchronization signals sent by the first satellite. In some embodiments, the first synchronization signal may be a synchronization signal sent by the network device via the first satellite to the terminal device or to a serving cell where the terminal device is located. For example, the network device may send or broadcast the first synchronization signal to the terminal device within the serving cell via the first satellite. In some embodiments, the first synchronization signal may be a synchronization signal broadcasted by the first satellite itself.

The second synchronization signal is configured for synchronization of the terminal device with the second satellite, which may be replaced with that the second synchronization signal is associated with the second satellite. Exemplarily, the second synchronization signal may include all signals sent by the second satellite for synchronization.

In some embodiments, the second synchronization signal may be a synchronization signal sent by the network device via the second satellite to the terminal device or to a serving cell in which the terminal device is located. In some embodiments, the second synchronization signal may be a synchronization signal broadcasted by the second satellite itself. For example, when the second satellite carries a base station, the second satellite may directly broadcast the second synchronization signal.

Each of the first synchronization signal and the second synchronization signal may be any of synchronization-related signals sent by the first satellite and the second satellite. In some embodiments, the first synchronization signal and the second synchronization signal may be SSBs or SS/PBCH blocks. For example, the first synchronization signal is a first SSB, and the second synchronization signal is a second SSB. In some embodiments, the first synchronization signal may be a primary synchronization signal (PSS) and/or a secondary synchronization signal (SSS). For example, the first synchronization signal is a first PSS and/or a first SSS, and the second synchronization signal is a second PSS and/or a second SSS.

In some embodiments, the first synchronization signal and the second synchronization signal may be the same type of synchronization signal. For example, the first synchronization signal and the second synchronization signal are both SSBs.

In some embodiments, the first synchronization signal and the second synchronization signal may be different types of synchronization signals. For example, the first synchronization signal is a first SSB, the second synchronization signal is a second PSS and a second SSS. Alternatively, the first synchronization signal is a first PSS and a first SSS, the second synchronization signal is a first SSB.

In some embodiments, the first synchronization signal and the second synchronization signal may be SSBs designed according to a conventional structure. Information for synchronization may be included in the first synchronization signal and the second synchronization signal. In some embodiments, the first synchronization signal and the second synchronization signal may be SSBs designed based on an improved structure.

For the first synchronization signal, since the first satellite is currently still providing services to the terminal device, the first synchronization signal may be configured for a variety of operations such as beam management or connection restoration between the terminal device and the first satellite, which is not limited herein. For the second synchronization signal, the terminal device needs to synchronize with the second satellite via the second synchronization signal to establish a connection. Therefore, the second synchronization signal may be configured for limited operations such as initial beam alignment between the terminal device and the second satellite.

The terminal device may perform synchronization with the second satellite via the second synchronization signal after detecting the second synchronization signal. This synchronization enables the terminal device to access the network associated with the second satellite to complete the handover. Exemplarily, with the unchanged PCI, the terminal device may immediately trigger a RACH-based handover or a RACH-free handover after achieving downlink synchronization with the second satellite through the second synchronization signal.

In order to avoid or mitigate the first synchronization signal interfering with the synchronization performed by the terminal device with the second satellite, the terminal device may determine, based on the first information, a first resonance signal and a second synchronization signal respectively associated with the first synchronization signal and the second synchronization signal. For the sake of brevity, the following explanation uses the second resource domain associated with the second synchronization signal as an example.

The second resource domain being associated with the second synchronization signal may indicate that some or all of the resources in the second resource domain are configured to carry the second synchronization signal. In some embodiments, the network device configures the second satellite to send the second synchronization signal to the terminal device using resources within the second resource domain. In some embodiments, the second satellite may directly send the second synchronization signal to the terminal device on the resources in the second resource domain.

In some embodiments, the second resource domain being associated with the second synchronization signal may indicate that the terminal device performs reception and measurement of the second synchronization signal on some or all of the resources in the second resource domain.

It is noted that the second resource domain being associated with the second synchronization signal does not limit the second synchronization signal to being necessarily on resources in the second resource domain. For example, while the resources in the second resource domain are configured to carry the second synchronization signal, the second satellite may not be transmitting the second synchronization signal on the second resource domain due to various reasons.

In some embodiments, the second resource domain may represent a resource area for the terminal device to detect the second synchronization signal within that resource area. The second resource domain may also be replaced with a second resource range.

As an embodiment, the second resource domain may be an SMTC window. The terminal device may perform a measurement of the second synchronization signal based on the SMTC over a carrier (frequency) configured for the serving cell broadcasted the second satellite.

In some embodiments, the resources in the second resource domain may include arbitrary resources for carrying the second synchronization signal. Exemplarily, the resources in the second resource domain may include one of a time-domain resource, a frequency-domain resource and an orthogonal code sequence resource, or a combination thereof.

In some embodiments, the resources in the second resource domain may be a time-domain resource for carrying the second synchronization signal. For example, the second resource domain may be a time window. The terminal device may determine a time-domain range corresponding to the second resource domain based on the configuration information of the time window, and perform the detection of the second synchronization signal.

In some embodiments, the resources in the second resource domain may be a frequency-domain resource for carrying the second synchronization signal. For example, the second resource domain may include a frequency-domain resource within a particular carrier range.

The resources in the second resource domain may be continuous or discontinuous, which is not limited herein.

In some embodiments, the second resource domain may be a resource configured by the network device for the second satellite. As an example, when the second resource domain is a time window, the network device may configure the time window of the second satellite to the terminal device in the form of an SMTC offset. The configuration information of the SMTC may be configured to indicate a carrier used by the second satellite, a subcarrier spacing (SCS) applied to the carrier, and a plurality of durations based on SSB measurements.

The first resource domain may be any resource region orthogonal to the second resource domain to avoid the first synchronization signal and the second synchronization signal interfering with each other. An explanation of the first resource domain may be referred to the second resource domain, which is not be repeated herein.

In some embodiments, the first resource domain and the second resource domain include the same type of resources to facilitate determination of orthogonality. For example, the resources in both the first resource domain and the second resource domain are time-frequency resources.

The terminal device may determine the first resource domain and the second resource domain based on the first information. That is, the first information may be configured for the terminal device to determine the first resource domain and the second resource domain. Exemplarily, the first information may explicitly or implicitly indicate the first resource domain and/or the second resource domain.

In some embodiments, the resources in the first resource domain and the second resource domain are orthogonal, the first information indicates the first resource domain or the second resource domain, the terminal device may determine the second resource domain or the first resource domain based on the indicated first resource domain or second resource domain, respectively.

As an example, the first information may indicate a first resource domain, and the second resource domain includes resources outside of the first resource domain. The terminal device does not detect the first synchronization signal on the second resource domain, and thus there is no interference. For example, the terminal device may know, through communication with the first satellite, a timing at which the first synchronization signal appears, and a synchronization signal detected at a timing other than the timing may be considered to be broadcasted by the second satellite. As another example, the terminal device may know the appearance timing of the first synchronization signal based on a common timing advance (TA), ephemeris or ephemeris parameter of the first satellite, thereby determining a possible appearance timing of the second synchronization signal.

In some embodiments, the first information may directly indicate all resources included in the second resource domain to avoid the terminal device performing a blind search for the second synchronization signal. For example, the first information may directly indicate an index of the second synchronization signal, and the terminal device may detect the second synchronization signal at a corresponding location based on the index.

In some embodiments, the first information may indicate a first resource domain and a second resource domain, enabling the terminal device to more clearly distinguish whether a received synchronization signal is from the first satellite, the second satellite, or another satellite.

As an example, when the first resource domain and the second resource domain are time-frequency resources, the first resource domain may include a first time window, and the second resource domain may include a second time window. The first information may include SMTC and assistance information. The terminal device may determine the first time window and the second time window based on the SMTC and assistance information in the first information. For example, in order to enable the terminal device in an idle/inactive/connected state to accurately measure SSBs in the NTN scenario, the terminal device may adjust the measurement time window of SMTC based on ephemeris parameters and offset parameters of different satellites. That is, for different propagation times and offset parameters from different satellites, the terminal device may use different offsets to obtain a first time window and a second time window. Further, the terminal device may detect, within the first time window and the second time window respectively, a first synchronization signal sent by the first satellite and a first synchronization signal sent by the second satellite.

As an example, the first information may indicate the first time window associated with the first synchronization signal and the second time window associated with the second synchronization signal. Exemplarily, the first time window and the second time window may both be determined according to the SMTC. SMTC. That is, the terminal device may configure two SMTC time windows based on at least one SMTC. The first SMTC time window (SMTC1) is applied to SSB measurement of the first satellite serving the cell, and the second SMTC time window (SMTC2) is applied to SSB measurement of the second satellite with the same PCI.

As an implementation, when assistance information associated with the handover is transmitted to the terminal device via a broadcast message or a proprietary message, the terminal device may accordingly determine an update of the SMTC offset and measurement gap configuration of the second satellite. Based on relevant information of the SMTC, the terminal device may configure two SMTC time windows corresponding to the two satellites.

As an implementation, the terminal device may configure a first SMTC time window and a second SMTC time window based on assistance information associated with the second satellite. For example, when the assistance information includes a time offset between the second SSB and the first SSB, the terminal device may configure the first SMTC time window and the second SMTC time window based on the time offset.

In some embodiments, the first resource domain and the second resource domain are in a correlation relationship such as offset. The second resource domain may be determined based on the first resource domain and that correlation relationship. For example, for the first satellite and the second satellite covering a serving cell with the same PCI, a difference in propagation delay or offset parameter between the two satellites and the terminal device may result in an offset in the synchronization signal measurement window.

In some embodiments, the second resource domain may be determined based on the first resource domain and a first offset. When the first resource domain is a time-domain resource or a time-frequency resource, the first offset may be a time offset. When the first resource domain is a frequency-domain resource or a time-frequency resource, the first offset may be a frequency offset.

As an example, the first information may be configured to determine a relative offset of the first time window and the second time window. After the terminal device determines the first time window, the second time window may be determined based on the first time window and the first offset. For example, the first time window may be determined based on the SMTC, and the second time window is determined based on the first time window and the first offset.

As an implementation, the terminal device may configure the time window for SSB broadcasting by the second satellite using the SMTC window (first time window) and the time offset (first offset) between the SSB of the second satellite and the SSB of the first satellite. The first offset will be exemplarily illustrated later in connection with FIGS. 7 and 8, using the time offset as an example.

In some embodiments, the terminal device may adjust the first resource domain and/or the second resource domain according to the detection of the synchronization signal. Exemplarily, in response to the terminal device failing to detect within the second time window the second synchronization signal, the terminal device may adjust the second time window based on assistance information associated with the second satellite and/or assistance information associated with the handover. Additionally, the terminal device may further send the adjustment information of the second time window to the network device.

As an example, when the second time window is an SMTC window, if the SSBs of the second satellite associated with the SMTC are all detectable, the terminal device may continue the measurement based on the SMTC. If the SSBs of the second satellite are not detected within the SMTC window, the terminal device may adjust the SMTC window and the periodicity and/or offset and/or duration of the measurement gap corresponding to the SMTC window based on a variety of information. For example, the terminal device may adjust the second time window based on a propagation delay of the first satellite currently serving the serving cell and a propagation delay of the second satellite with the SSB undetected.

In some embodiments, the terminal device may adjust the first resource domain and/or the second resource domain based on movements of the satellites and the terminal device itself. For example, the terminal device may adjust, based on the movement information of the two satellites, the SMTC configured to determine the first time window and the second time window.

As an example, the terminal device may dynamically adjust or periodically adjust the first time window and/or the second time window. For example, when the time window is an SMTC window or is determined based on the SMTC window, the terminal device may dynamically or periodically update the SMTC and the measurement gap configuration based on positional information of the terminal device and/or movement information of the satellite.

In some embodiments, after making an adjustment to the time window or the SMTC, the terminal device may report the adjustment information of the time window to the network device corresponding to the first satellite and/or the second satellite. That is, the terminal device may notify the network device of these updates by sending a report. Exemplarily, the report sent by the terminal device may indicate a time offset of the SMTC with respect to the SSB measurement timing of the first satellite. Exemplarily, the report may indicate a time offset of the SMTC measurement window with respect to the starting position of the SSB broadcasted by the second satellite. Exemplarily, the report may indicate a time offset of the measurement gap's starting position within the measurement gap configuration periodicity of the serving cell.

In some embodiments, where the first resource domain and the second resource domain are frequency-domain resources, the first information may indicate frequency ranges corresponding to the first resource domain and the second resource domain, respectively. For example, the first synchronization signal and the second synchronization signal may be transmitted on different carriers to avoid mutual interference.

As an example, the different carriers may include carriers with different subcarrier spacings, and a size of a subcarrier interval corresponding to the synchronization signal may be selected by the system according to the actual situation. Generally, the smaller the subcarrier spacing is, the faster the signal is transmitted, which also results in increased interference and noise of the signal. Conversely, the larger subcarrier spacing reduces signal transmission speed, but improves the signal quality and reliability. In practice, the subcarrier spacing is usually selected according to different application scenarios and requirements. For example, in high-speed moving scenarios, a smaller subcarrier spacing is required to increase the transmission speed and reliability of the signal. In low speed moving or stationary scenarios, a larger subcarrier spacing may be selected to reduce signal interference and noise.

As an example, the first information may indicate a first carrier and a second carrier with different subcarrier spacings. The first carrier is associated with the first synchronization signal, and the second carrier is associated with the second synchronization signal. That is, to avoid synchronization signal collision, the first synchronization signal and the second synchronization signal may be sent on carriers corresponding to different subcarrier spacings, respectively.

In some embodiments, the first information may include a parameter indicating a signal index (e.g., an SSB index) corresponding to the synchronization signal. In such scenario, the first resource domain and the second resource domain may be parameters indicating different signal indexes, or time-frequency resources on which different synchronization signals are located. When the terminal device determines a second signal index corresponding to the second synchronization signal based on the first information, the terminal device may detect a synchronization signal within resources corresponding to the second signal index.

As an example, during a soft handover between satellites, the network device may provide to the terminal device, via a parameter, first signal index information and second signal index information corresponding to the first synchronization signal and the second synchronization signal, respectively. The first signal index is different from the second signal index. The terminal device may select different signal indexes for measurements corresponding to different satellites.

As an example, the two satellites may use different beams for transmission of the synchronization signal during a coverage overlapping duration. The different beams correspond to different SSB indexes. The terminal device only needs to detect the SSB index of the second satellite.

As an example, the first information may include a first parameter configured to indicate a synchronization signal position or a synchronization signal index. The terminal device may perform a bitwise inversion on bits of the first parameter to obtain a second parameter. The first signal index and the second signal index may be determined from the first parameter and the second parameter, respectively. For example, the terminal device may determine the first signal index based on the first parameter, thereby determining a resource where the first synchronization signal is located. The second parameter is configured to determine the second signal index. As another example, the terminal device may determine the first signal index based on the second parameter, thereby determining the resource where the first synchronization signal is located. The first parameter is then configured to determine the second signal index.

As a possible implementation, the first parameter may be inOneGroup. The parameter inOneGroup includes 8 bits. By configuring a range of values for the 8 bits of inOneGroup, the terminal device can detect a second synchronization signal based on the second signal index, and does not detect a first synchronization signal. For example, in the case where inOneGroup=10101010, the terminal device will detect SSBs at positions 1, 3, 5, and 7 (i.e., SSB0, SSB2, SSB4 and SSB6), but not SSBs in positions 2, 4, 6, and 8 (i.e., SSB1, SSB3, SSB5, SSB7).

As an example, the first information may include the first parameter and the second parameter as previously described to indicate the resources corresponding to the first synchronization signal and the second synchronization signal, respectively. As an implementation, the second parameter may be inOneGroup (1). When a range of values of 8 bits for inOneGroup is configured, a range of values of 8 bits for inOneGroup (1) can be obtained. The values of the two parameters inOneGroup and inOneGroup (1) are related to each other. As an implementation, the terminal device may determine a first signal index and detect a first synchronization signal based on the values of inOneGroup, and may determine a second signal index and detect a second synchronization signal based on the values of inOneGroup (1).

As a possible implementation, the values of inOneGroup (1) is obtained by performing a bitwise inversion of the 8 bits of inOneGroup, so that the signal indexes indicated by inOneGroup and inOneGroup (1) do not overlap and conflict.

For example, with inOneGroup=[10101010], the terminal device detects in the NTN network of the first satellite: SSB0, SSB2, SSB4, and SSB6, and with inOneGroup (1)= [01010101], the terminal device detects in the NTN network of the second satellite: SSB1, SSB3, SSB5, and SSB7.

In some embodiments, the first information may include a combination of multiple pieces of information. For example, when the signal index is combined with the SMTC measurement time window, the first information may indicate a first parameter and a second parameter, and may also indicate at least one slot offset from the first time window and the second time window. As another example, when the carrier information is combined with the SMTC, the first SMTC for measuring the first synchronization signal may be located on the first carrier, and the second SMTC for measuring the second synchronization signal may be located on the second carrier.

The method for determining the first resource domain and the second resource domain by means of various types of first information are described above. After determining the first resource domain and the second resource domain, the terminal device detects the corresponding synchronization signals in the different resource domains. For ease of understanding, taking the synchronization signal being an SSB as an example, the time-domain position of the SSBs and the process of detecting the synchronization signal by the terminal device are exemplarily described with reference to FIG. 6.

During the SSB search procedure, the terminal device first performs signal reception on each potential frequency point sequentially within the corresponding frequency band. Specifically, after low-pass filtering is performed on the baseband, SSB bandwidth signals may be retained. Correlation peak searches using the PSS and SSS are then conducted to determine frame boundaries and the PCI of the cell. It is to be noted that when sliding correlation is performed on PSS/SSS, there may be multiple peaks. In this case, the strongest correlation peak (i.e., the strongest SSB) is selected.

The terminal device can determine time-domain and frequency-domain parameters of the SSBs from broadcasted SIB information. Specifically, the terminal device can obtain the periodicity of the SSB in the time-domain and the position of the SSB in the frequency-domain through SIB1. The time-domain parameters can be obtained via SIB-→ServingCellConfigCommonSIB→ssb→periodicityerv-ingCellSIB. The time-domain position may then be determined according to the SSB pattern defined by the 3rd generation partnership project (3GPP) protocol.

Further, after the terminal device receives the first SSB and gets the master information block (MIB) from the physical broadcast channel (PBCH), the position of SIB1 is determined. After receiving SIB1, the terminal device can determine the frequency-domain position of the subsequent SSB periodicity, thereby eliminating the need for blind detection across the entire frequency band.

Further, while determining the frequency-domain position, the terminal device determines the SSB periodicity in the time-domain. There are multiple candidate SSBs from the time-domain. The network device may describe the position information of the SSB in SIB1 via SIB1→ServingCellConfigCommonSIB→ssb→PositionsInBurst parameter. Specifically, the parameter inOneGroup in ssb-PositionInBurst may indicate the SSB position, and inOneGroup is generally represented by 8 bits. For different frequency bands or frequency ranges, the inOneGroup may represent the position information of the SSB in different ways.

Exemplarily, when f≤3 GHZ, the maximum number of SSBs within a synchronization signal (SS) burst set is 4. Therefore, 4 bits are sufficient for representation, and the remaining 4 bits are temporarily ignored. As an example, in the inOneGroup, the leftmost 4 bits are valid, that is, the upper 4 bits are valid, while the lower 4 bits are invalid. In the inOneGroup, the upper 4 bits can represent as SSB0 to SSB3 sequentially from left to right.

Exemplarily, when 3 GHz<f≤6 GHz, the maximum number of SSBs within the SS burst set is 8. Therefore, 8 bits are required for representation. That is, all the 8 bits in the inOneGroup are valid. The 8 bits represent SSB0 to SSB7 sequentially from left to right.

Exemplarily, when f>6 GHZ, the maximum number of SSBs within the SS burst set is 64. All 8 bits in the inOneGroup are valid, and need to indicate the position of the SSB together with an additional field of 8 bits of the parameter groupPresence.

An exemplary illustration of time-domain positions of SSBs is given in FIG. 6. In FIG. 6, one radio frame spans 10 ms, with a half-frame duration of 5 ms. The subcarrier interval is 15 KHz, resulting in 5 slots in the half-frame, including slot 0 to slot 4. Each slot contains 14 symbols, and symbols across these 5 slots are contiguously numbered. That is, symbols within slot 0 are symbol 0 to symbol 13, symbols within slot 1 are from symbol 14 to symbol 27, and so on.

In the frequency band with f≤3 GHZ, there are two SSBs in one slot. Each SSB occupies 4 symbols. As shown in FIG. 6, there are SSBs in the first two slots in a half-frame, so there are a total of 4 SSBs. In FIG. 6, starting symbols of the 4 SSBs are symbol 2, symbol 8, symbol 16, and symbol 22. Based on the 4 starting symbols, the terminal device can determine the position of each of the 4 SSBs in the time domain.

The above, in conjunction with FIGS. 5 and 6, describes the method of how to determine the first resource domain and the second resource domain and how to detect the synchronization signal on the resource domain. With the method, the network device may configure the first satellite and the second satellite to send the first synchronization signal and the second synchronization signal on the first resource domain and the second resource domain, respectively, and the terminal device may detect the synchronization signals on the two resource domains, respectively, so that mutual interference of the synchronization signals can be avoided or mitigated.

To facilitate determining the first resource domain and the second resource domain, the first information may include relevant information of the first satellite and the second satellite, or, the first information may be determined based on such relevant information. Since the terminal device is currently connected to a network where the first satellite is located, the relevant information of the first satellite can be determined by the terminal device. Therefore, how the terminal device determines the relevant information of the second satellite is a problem to be solved.

In some embodiments, the terminal device may receive assistance information associated with the second satellite. Exemplarily, the assistance information may be provided to the terminal device by the first satellite or may be provided to the terminal device by the second satellite.

The assistance information associated with the second satellite may include information for a handover. As an example, the assistance information associated with the second satellite may be NTN configuration information for the second satellite. For example, the assistance information may include ephemeris and common TA parameters. In a handover, the common TA and ephemeris of the second satellite are important information for the terminal device to perform full time-frequency domain synchronization compensation. Therefore, it is necessary to provide the common TA and ephemeris of the second satellite before the handover starts. As another example, the assistance information may further include parameters such as new common TA, $K_{mac}$ and specific SMTC offset of the network where the second satellite is located. As another example, when the second synchronization signal is an SSB, the assistance information may further include SSB index information, an offset of the SSB, and other information associated with the second synchronization signal.

In some embodiments, the assistance information associated with the second satellite further includes a configuration parameter of the second SMTC corresponding to the second synchronization signal. The configuration parameter is, for example, a time offset between the second SMTC and the SMTC of the first satellite.

In some embodiments, the assistance information associated with the second satellite may further include some or all of parameter information of the second synchronization signal to facilitate detection of the second synchronization signal by the terminal device. Exemplarily, the parameter information is, for example, second signal index information, synchronization information of the second synchronization signal, and a time offset between the second synchronization signal and the first synchronization signal.

As an example, when the first synchronization signal is a first SSB and the second synchronization signal is a second SSB, the assistance information associated with the second satellite may include at least one of: index information of the second SSB, a second signal index, a difference between the second SSB index and the first SSB index, a time offset of the second SSB, an offset of the second SSB with respect to the first SSB, and synchronization information of the second SSB.

As an example, the assistance information associated with the second satellite may also be ephemeris information for the second satellite. For example, the assistance information may include orbital ephemeris parameters of the second satellite, and position, velocity and time information (i.e., PVT information) of the second satellite.

In some embodiments, the assistance information associated with the second satellite may be sent to the terminal device in a variety of ways. Exemplarily, since the first satellite and the second satellite overlap in coverage of a serving cell, the assistance information associated with the second satellite may be carried in the system information. The terminal device may then retrieve the information associated with the second satellite by reading a broadcast message. Exemplarily, the assistance information associated with the second satellite may be sent to the terminal device via dedicated signaling.

In some embodiments, the terminal device may receive assistance information associated with the second satellite sent by the first satellite. That is, the first satellite may send assistance information associated with the second satellite to the terminal device. For the network side, the network device sends assistance information associated with the second satellite to the terminal device via the first satellite.

It is to be noted that the network device sending assistance information associated with the second satellite to the terminal device via the first satellite may refer to that the first satellite of the network device directly sends the assistance information associated with the second satellite to the terminal device, or that after the network device sends the assistance information associated with the second satellite to the first satellite, the first satellite forwards the assistance information associated with the second satellite to the terminal device.

In some embodiments, the terminal device may receive the assistance information associated with the second satellite from the second satellite.

In some embodiments, the assistance information associated with the second satellite may be carried in a SIB. In some embodiments, the first satellite may broadcast SIB 19 to send down the assistance information associated with the second satellite.

As an example, the assistance information associated with the second satellite may be carried in the SIB 19 of the second satellite or the first satellite. In the serving cell, the terminal device may read the SIB 19 to determine the assistance information.

As an example, the terminal device may obtain assistance information associated with the second satellite from the SIB19 of the first satellite at a time point after or before a time of appearance of the second satellite. The time of appearance of the second satellite refers to a time when the first satellite senses or perceives the second satellite, or may be a time associated with the second satellite determined by the first satellite through the network device, ephemeris information, or other means. After the appearance of the second satellite, the satellite assistance information of the serving cell in the SIB19 may be configured for the terminal device to synchronize with the second satellite.

For example, according to the abstract syntax notation one (ASN.1) structure of the existing SIB19, the SIB19 contains two parts of information, one part for the serving cell and the other part for the neighbouring cell. Since the PCI is unchanged before and after the service link handover, the assistance information associated with the second satellite may be information of the serving cell.

As another example, SIB19 may introduce a new field to provide assistance information for the second satellite under service link handover in the case where the PCI is unchanged. After reading SIB19, the terminal device may distinguish the SSBs or SSB indexes of the first satellite and the second satellite within the overlap duration to avoid conflicts.

As an example, the terminal device may obtain the information of SIB 19 from the second satellite. In this scenario, it will take some time for the terminal device to acquire the SIB 19 after the second satellite is present.

In some embodiments, the terminal device may obtain the assistance information associated with the second satellite via an RRC dedicated message.

In some embodiments, the terminal device may acquire the assistance information associated with the second satellite before the T-Service starts. That is, the terminal device starts synchronization with the target satellite before the T-Service of the first satellite to perform a soft handover.

It should be understood that the terminal device may be any terminal within the serving cell. In the case where the PCI is unchanged, all terminal devices in the serving cell will perform the synchronization with the second satellite under the service link soft handover. When the network device broadcasts the assistance information associated with the second satellite in the SIB 19 of the serving cell may depend on the network (NW) implementation. Exemplarily, when the NW begins broadcasting the information, the NW may notify the terminal device to reacquire the SIB 19 through a current process (e.g., a system information modification process). Further, the terminal device may evaluate the TA based on the assistance information associated with the second satellite, and perform TA pre-compensation prior to the random access process.

In some embodiments, the network may periodically provide the assistance information associated with the second satellite to the terminal device. For example, the first satellite may periodically transmit the assistance information associated with the second satellite via broadcast messages.

In some embodiments, the network needs to further provide the terminal device with assistance information necessary to perform a hard handover or soft handover of satellites with unchanged PCI. During the soft handover, the first satellite coverage overlaps with the second satellite coverage for a duration. The assistance information of the second satellite (which will be the new serving cell) may be provided to the terminal device by the first satellite of the serving cell before the T-Service.

From the above, there is an offset between the first resource domain and the second resource domain, so in the case where the terminal device determines the first resource domain, the second resource domain can be determined by the first resource domain and the first offset. In order to more accurately determine the second resource domain, relevant information of the first satellite and the second satellite needs to be taken into account together for the first offset. The information is, for example, position information or movement information of the satellites.

Exemplarily, when the resource domain is a measurement window of the SMTC, the first offset is an offset of the measurement window of the SMTC.

In some embodiments, the first offset may be determined based on at least one of the following information: propagation delays for the terminal device to communicate with the first satellite and the second satellite, respectively; offset parameters corresponding to the first satellite and the second satellite, respectively; position information of the first satellite and the second satellite; position information of the terminal device; and movement information of the second satellite.

As an example, the position information of the terminal device may be determined in a variety of ways. For example, for a terminal device that supports a global navigation satellite system (GNSS), the position information of the terminal device may be obtained via the GNSS. For another example, for a terminal device that does not support GNSS, the position information of the terminal device may be obtained through network-assisted positioning.

As an example, the position information of the first satellite and the second satellite may be determined by ephemeris information (ephemerisInfo). The movement information of the second satellite may be determined by PVT information.

As an example, the offset parameters corresponding to the first satellite and the second satellite, respectively, may refer to an offset parameter corresponding to the first satellite and an offset parameter corresponding to the second satellite. The offset parameter may be configuration information for handover. For example, the offset parameter may be a $K_{offset}$ configured for determining uplink timing by the network in which the satellite is located.

In some embodiments, the first offset may be determined based on the offset parameters of two satellites. As an example, the offset parameter corresponding to the first satellite includes a second offset configured for determining the uplink timing, the offset parameter corresponding to the second satellite includes a third offset for determining the uplink timing, and the first offset is determined based on a difference between the second offset and the third offset. Taking as an example the first resource domain and the second resource domain being a first SMTC window (SMTC1) and a second SMTC window (SMTC2), respectively, when the second offset is $K_{offset1}$ corresponding to the first satellite and the third offset is $K_{offset2}$ corresponding to the second satellite, SMTC2=SMTC1+|$K_{offset1}$−$K_{offset2}$|.

In some embodiments, the first offset may be determined based on a difference between the propagation delays of the terminal device to communicate with the first satellite and the second satellite, respectively. Since the distances from the first satellite and the second satellite to the terminal device may be different, there is a difference between the path propagation delays of the terminal device to the first satellite and the second satellite.

As an example, the propagation delay difference may be determined in a variety of ways. Exemplarily, the propagation delay difference may be determined from position information of the terminal device, the first satellite, and the second satellite. Exemplarily, the propagation delay difference may be determined by movement information of the first satellite and the second satellite.

As an example, the first offset may be a product of a first time constant L and a first coefficient K. A time unit of the first time constant may be determined based on a time unit of the resource domain. The first coefficient may be determined based on a distance or direction angle of the terminal device from the two satellites.

Exemplarily, when the resource domain is an SMTC measurement window, a unit of a value of L may depend on a measurement unit of the SMTC measurement window. If the SMTC measurement window uses symbols as its unit, the value of L is in symbols; and if the SMTC measurement window uses slots as its unit, the value of L is in slots.

As an implementation, the position information of the first satellite and the terminal device may be configured for determination of a first direction angle between the first satellite and the terminal device, the position information of the second satellite and the terminal device may be configured for determination of a second direction angle between the second satellite and the terminal device, and the first offset may be determined based on the first direction angle and the second direction angle, where a direction angle may be an included angle of a line connecting a satellite to the terminal device and a vertical line from the satellite to the ground.

For ease of understanding, a manner of determining the first offset is exemplarily described below in conjunction with FIG. 7 by taking SMTC1 and SMTC2 as an example. For the sake of brevity, terms already explained in FIG. 4 are not repeated. Referring to FIG. 7, the first direction angle between the first satellite 710 and the terminal device 730 is 81, the second direction angle between the second satellite 720 and the terminal device 730 is 82, and SMTC1 and SMTC2 may be determined according to the following formula: SMTC2=SMTC1+K×L, where K×L is the first offset and K can be expressed as:

$$K = \frac{\cos\delta1}{\cos\delta2}.$$

As an implementation, the position information of the first satellite and the terminal device may be configured for determination of a first distance between the first satellite and the terminal device, the position information of the second satellite and the terminal device may be configured for determination of a second distance between the second satellite and the terminal device, and the first offset may be determined based on the first distance and the second distance.

Still taking SMTC1 and SMTC2 as an example, a description is given in connection with FIG. 7. Referring to FIG. 7, when the first distance between the first satellite 710 and the terminal device 730 is D1 and the second distance between the second satellite 720 and the terminal device 730 is D2, a ratio of D1 to D2 may be configured as a coefficient K of the first offset. That is, in SMTC2−SMTC1+K×L, K may be expressed as:

$$K = \frac{D1}{D2}.$$

As an example, in some embodiments, the first offset may be determined based on a distance between the first satellite and the second satellite based on a moving trajectory and movement information of the satellites. That is, the first offset may be associated with a trajectory distance between the current positions of the first satellite and the second satellite and movement speeds of the first satellite and the second satellite. The trajectory distance may be a distance travelled by the second satellite along the moving trajectory from its current position to the current position of the first satellite.

Exemplarily, the position of the first satellite at the current time instant is a first position, the position of the second satellite at the current time instant is a second position, and the first offset may be determined based on a time required for the second satellite to move from the second position to the first position.

Exemplarily, the first offset may be a transit time for the second satellite to move from its current position to the current position of the first satellite along the moving trajectory.

For ease of understanding, another manner of determining the first offset is exemplarily described below in connection with FIG. 8. For the sake of brevity, terms already explained in FIG. 4 or FIG. 7 are not repeated. Referring to FIG. 8, when the trajectory distance between the first satellite 810 and the second satellite 820 is D and the velocity of the second satellite is V2, the first offset A may be expressed as: Δ=D/|$V_2$|.

Multiple manners of determining the first offset are described above in conjunction with FIGS. 7 and 8. Within the serving cell, the terminal device may determine a first resource domain corresponding to the first satellite, and then determine a second resource domain based on the first resource domain and the first offset. Based on the determined second resource domain, the terminal device may not only search for the synchronization signal of the second satellite in a targeted manner, but also avoid the synchronization signal of the first satellite from interfering with the handover process, thereby improving the handover efficiency.

The method and possible implementations of the embodiments of the present disclosure are described above in connection with FIGS. 5 to 8. For a better understanding of the present disclosure, taking as an example the first satellite and the second satellite being connected to the same network device, the embodiments of the present disclosure is described below in detail in conjunction with FIG. 9. It should be understood that the method shown in FIG. 9 is only an example, which is not a limitation of the embodiments of the present disclosures.

Figures 9, 10, 11, 12:
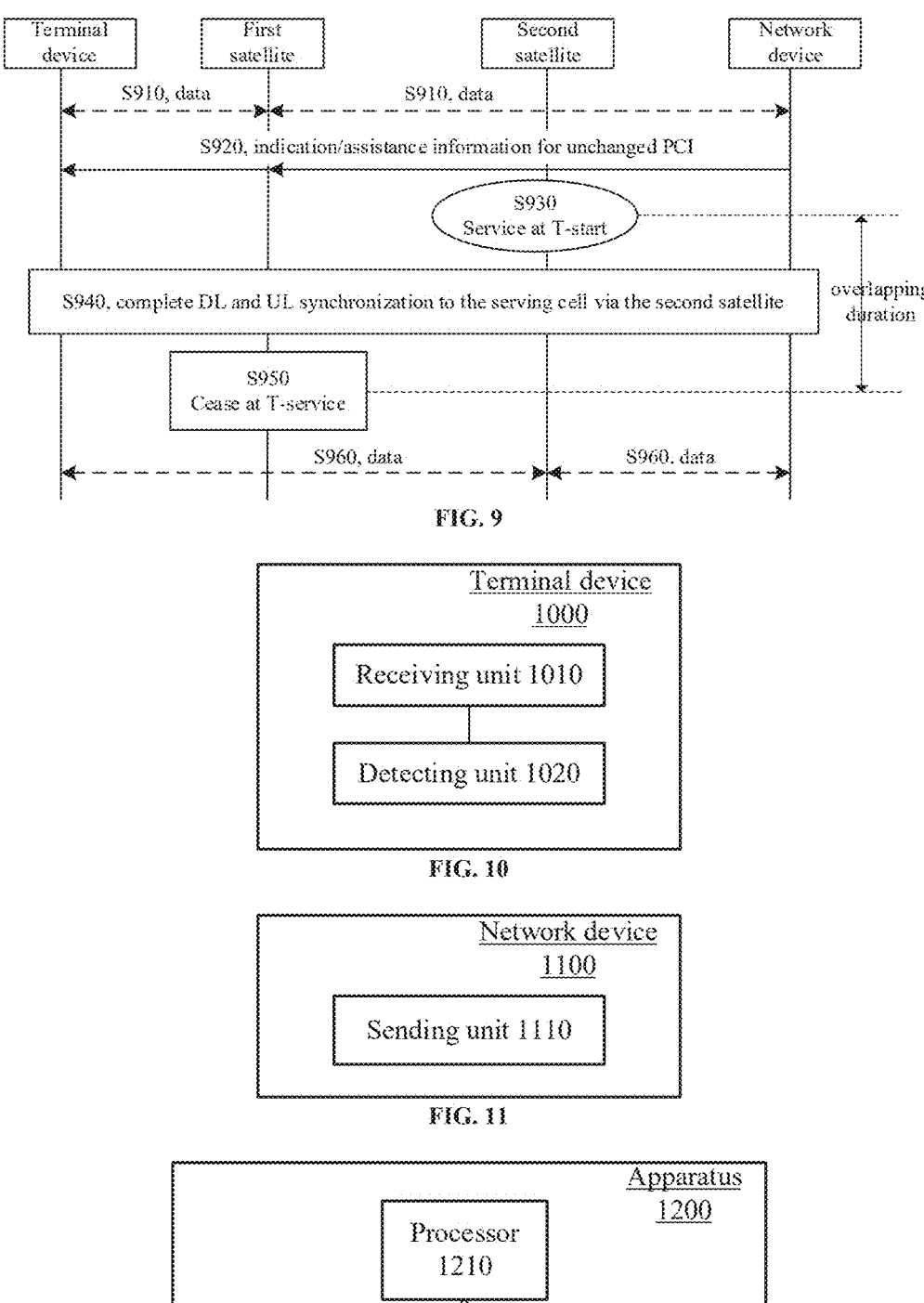
FIG. 9 is a flow chart of one possible implementation of the method shown in FIG. 5.
FIG. 10 is a schematic structure diagram of a terminal device according to embodiments of the present disclosure.
FIG. 11 is a schematic structure diagram of a network device according to embodiments of the present disclosure.
FIG. 12 is a schematic structure diagram of a communication apparatus according to embodiments of the present disclosure.

FIG. 9 illustrates the interaction of the terminal device, the first satellite, the second satellite, and the network device.

Referring to FIG. 9, at operation S910, the network device performs data transmission with the first satellite, and the first satellite performs data transmission with the terminal device, where the first satellite acts as a relay between the network device and the terminal device.

At operation S920, the network device sends an indication/assistance information for unchanged PCI via the first satellite. The first satellite may broadcast this information to the terminal device. The indication may include a first handover command. The assistance information may include assistance information associated with the second satellite.

At operation S930, the second satellite starts providing services at T-start. T-start is a second time point.

At operation S940, the terminal device completes DL and UL synchronization to the serving cell via the second satellite (acquire the DL and UL sync to the serving cell via a target satellite). The terminal device accesses a network where the second satellite is located.

At operation S950, the first satellite ceases service at T-service. T-service is a first time point. As can be seen in FIG. 9, the second time point precedes the first time point. A time interval between the second time point and the first time point is an overlapping duration in which the first satellite and the second satellite overlap in coverage of the serving cell. The terminal device may complete the handover within the overlapping duration.

At operation S960, the network device performs data transmission with the second satellite, and the second satellite performs data transmission with the terminal device. The second satellite acts as a relay between the network device and the terminal device.

The method embodiments of the present disclosure are described in detail above in conjunction with FIGS. 1 to 9. Device embodiments of the present disclosure are described in detail below in conjunction with FIGS. 10 to 12. It should be understood that the description of the device embodiments corresponds to the description of the method embodiments, and therefore, parts not described in detail can be referred to the preceding method embodiments.

FIG. 10 is a schematic block diagram of a terminal device of embodiments of the present disclosure. The terminal device 1000 may be any of the terminal devices described above. The terminal device 1000 shown in FIG. 10 includes a receiving unit 1010 and a detecting unit 1020.

The receiving unit 1010 may be configured to receive a first handover command. The first handover command is configured to instruct the terminal device to perform a handover from a first satellite to a second satellite.

The detecting unit 1020 may be configured to detect a first synchronization signal and a second synchronization signal within a first resource domain and a second resource domain, respectively. The first resource domain and the second resource domain are determined based on first information, a first synchronization signal is associated with the first satellite, and a second synchronization signal is configured for synchronization of the terminal device with the second satellite.

In some embodiments, the receiving unit 1010 is further configured to receive assistance information sent by the first satellite, where the assistance information is associated with the second satellite and configured for the terminal device to determine the first information.

In some embodiments, the first information is configured to indicate the first resource domain, and the second resource domain includes resources outside of the first resource domain.

In some embodiments, the first resource domain includes a first time window, the second resource domain includes a second time window, the first information is configured to indicate the first time window, and the second time window is determined based on the first time window and a first offset.

In some embodiments, the first time window is determined based on a synchronization signal block (SSB) measurement timing configuration (SMTC), or the first time window and the second time window are determined based on a synchronization signal block (SSB) measurement timing configuration (SMTC).

In some embodiments, the first offset is determined based on at least one of the following information: propagation delays for the terminal device to communicate with the first satellite and the second satellite, respectively; offset parameters corresponding to the first satellite and the second satellite, respectively; position information of the first satellite and position information of the second satellite; position information of the terminal device; and movement information of the second satellite.

In some embodiments, the offset parameter corresponding to the first satellite includes a second offset configured for determining an uplink timing, the offset parameter corresponding to the second satellite includes a third offset configured for determining an uplink timing, and the first offset is determined based on a difference between the second offset and the third offset.

In some embodiments, the position information of the first satellite and the position information of the terminal device are configured to determine a first direction angle between the first satellite and the terminal device, the position information of the second satellite and the position information of the terminal device are configured to determine a second direction angle between the second satellite and the terminal device, and the first offset is determined based on the first direction angle and the second direction angle.

In some embodiments, a position of the first satellite at a current time instant is a first position, a position of the second satellite at the current time instant is a second position, and the first offset is determined based on a time taken by the second satellite to move from the second position to the first position.

In some embodiments, the detecting unit 1020 is further configured for the terminal device to detect the second synchronization signal within the second time window. The terminal device 1000 further includes: an adjustment unit, configured to adjust the second time window in accordance with the assistance information associated with the second satellite in response to the terminal device failing to detect the second synchronization signal within the second time window; and a sending unit, configured to send adjustment information of the second time window to the network device.

In some embodiments, the first information includes a first carrier and a second carrier, the first carrier is associated with the first synchronization signal, the second carrier is associated with the second synchronization signal, and the first carrier and the second carrier have different subcarrier spacings.

In some embodiments, the first information includes a first parameter, bits of the first parameter are bitwise inverted to obtain a second parameter, the first synchronization signal corresponds to a first signal index, the second synchronization signal corresponds to a second signal index, and the first signal index and the second signal index are determined by the first parameter and the second parameter, respectively.

In some embodiments, the first parameter is inOneGroup.

In some embodiments, in the handover from the first satellite to the second satellite, a physical cell identifier (PCI) of a serving cell in which the terminal device is located is unchanged.

In some embodiments, the first handover command includes second information configured to instruct a network device sending the first handover command to support a handover with an unchanged PCI of a serving cell.

In some embodiments, the first handover command further includes a first time point at which the first satellite ceases services and a second time point at which the terminal device initiates synchronization with the second satellite. The second time point precedes the first time point. The terminal device 1000 further comprises: an execution unit, configured to perform the handover from the first satellite to the second satellite during a time interval between the second time point and the first time point.

FIG. 11 is a schematic block diagram of a network device of embodiments of the present disclosure. The network device 1100 may be any of the network devices described above. The network device 1100 shown in FIG. 11 includes a sending unit 1110.

The sending unit is configured to send a first handover command to a terminal device, where the first handover command is configured to instruct the terminal device to perform a handover from a first satellite to a second satellite. A second synchronization signal is configured for synchronization of the terminal device with the second satellite, a first synchronization signal is associated with the first satellite, a first resource domain and a second resource domain are configured for the terminal device to detect the first synchronization signal and the second synchronization signal, respectively, and the first resource domain and the second resource domain are determined based on first information.

In some embodiments, the sending unit is further configured to send assistance information associated with the second satellite to the terminal device via the first satellite, where the assistance information is configured for the terminal device to determine the first information.

In some embodiments, the first information is configured to indicate the first resource domain, and the second resource domain includes resources outside of the first resource domain.

In some embodiments, the first resource domain includes a first time window, the second resource domain includes a second time window, the first information is configured to indicate the first time window, and the second time window is determined based on the first time window and a first offset.

In some embodiments, the first time window is determined based on a synchronization signal block (SSB) measurement timing configuration (SMTC), or the first time window and the second time window are determined based on a synchronization signal block (SSB) measurement timing configuration (SMTC).

In some embodiments, the first offset is determined based on at least one of the following information: propagation delays for the terminal device to communicate with the first satellite and the second satellite, respectively; an offset parameter corresponding to the first satellite and an offset parameter corresponding to the second satellite; position information of the first satellite and position information of the second satellite; position information of the terminal device; and movement information of the second satellite.

In some embodiments, the offset parameter corresponding to the first satellite includes a second offset configured for determining an uplink timing, the offset parameter corresponding to the second satellite includes a third offset configured for determining an uplink timing, and the first offset is determined based on a difference between the second offset and the third offset.

In some embodiments, the position information of the first satellite and the position information of the terminal device are configured to determine a first direction angle between the first satellite and the terminal device, the position information of the second satellite and the position information of the terminal device are configured to determine a second direction angle between the second satellite and the terminal device, and the first offset is determined based on the first direction angle and the second direction angle.

In some embodiments, a position of the first satellite at a current time instant is a first position, a position of the second satellite at the current time instant is a second position, and the first offset is determined based on a time taken by the second satellite to move from the second position to the first position.

In some embodiments, the network device 1100 further includes a receiving unit configured to receive adjustment information of the second time window sent by the terminal device in response to the terminal device failing to detect the second synchronization signal within the second time window.

In some embodiments, the first information includes a first carrier and a second carrier, the first carrier is associated with the first synchronization signal, the second carrier is associated with the second synchronization signal, and the first carrier and the second carrier have different subcarrier spacings.

In some embodiments, the first information includes a first parameter, bits of the first parameter are bitwise inverted to obtain a second parameter, the first synchronization signal corresponds to a first signal index, the second synchronization signal corresponds to a second signal index, and the first signal index and the second signal index are determined by the first parameter and the second parameter, respectively.

In some embodiments, the first parameter is inOneGroup.

In some embodiments, in the handover from the first satellite to the second satellite, a physical cell identifier (PCI) of a serving cell in which the terminal device is located is unchanged.

In some embodiments, the first handover command includes second information configured to instruct the network device to support a handover with an unchanged PCI of a serving cell.

In some embodiments, the first handover command further includes a first time point at which the first satellite ceases services and a second time point at which the terminal device initiates synchronization with the second satellite, and the second time point precedes the first time point.

FIG. 12 illustrates a schematic structure diagram of a communication apparatus of embodiments of the present disclosure. The dotted line in FIG. 12 indicates that the unit or module is optional. The apparatus 1200 may be configured to implement the method described in the above method embodiments. The apparatus 1200 may be a chip, terminal device or network device.

The apparatus 1200 may include at least one processor 1210. The processor 1210 can support the apparatus 1200 in implementing the method described in the preceding method embodiments. The processor 1210 may be a general purpose processor or a dedicated processor. For example, the processor may be a central processing unit (CPU). Alternatively, the processor may be another general purpose processor, a digital signal processor (DSP), an application specific integrated circuit (ASIC), a field programmable gate array (FPGA) or other programmable logic devices, discrete gate or transistor logic devices, discrete hardware components, etc. The general-purpose processors may be a microprocessor or any conventional processor.

The apparatus 1200 may further include one or more memories 1220. The memory 1220 has stored thereon a program that is executable by the processor 1210 to cause the processor 1210 to perform the method described in the preceding method embodiments. The memory 1220 may be separate from the processor 1210 or integrated within the processor 1210.

The apparatus 1200 may further include a transceiver 1230. The processor 1210 may communicate with another device or a chip by the transceiver 1230. For example, the processor 1210 may transmit data to, or receive data from, another device or a chip by the transceiver 1230.

Some embodiments of the present disclosure further provide a computer-readable storage medium configured to store a program. The computer-readable storage medium may be applied to a terminal device or a network device according to the embodiments of the present disclosure, and the program causes a computer to perform the method performed by the terminal device or the network device according to the respective embodiments of the present disclosure.

The computer-readable storage medium may be any usable medium that is computer-readable or a data storage device such as a server or a data center that includes one or more usable media integrated. The usable medium may be a magnetic medium (e.g., a floppy disk, a hard disk and a tape), an optical medium (e.g., a digital video disc (DVD)), a semiconductor medium (e.g., a solid state disk (SSD)), or the like.

Some embodiments of the present disclosure further provide a computer program product. The computer program product includes a program. The computer program product may be applied to a terminal device or a network device according to the embodiments of the present disclosure, and the program causes a computer to perform the method performed by the terminal device or the network device according to the respective embodiments of the present disclosure.

In the embodiments described above, the technical solutions may be totally or partially practiced by software, hardware, firmware or any combination thereof. During practice by software, the technical solutions may be totally or partially implemented in the form of a computer program product. The computer program product includes one or more computer instructions. Loading and executing the computer instructions on a computer produces, in whole or in part, a process or function in accordance with the embodiments of the present disclosure. The computer may be a general purpose computer, a special purpose computer, a computer network, or other programmable device. The computer instructions may be stored in a computer-readable storage medium or transmitted from one computer-readable storage medium to another computer-readable storage medium. For example, the computer instructions may be transmitted from a web site, computer, server, or data center to another website site, computer, server or data center via a wired means (e.g., coaxial cable, fiber optic and digital subscriber line (DSL)) or a wireless means (e.g., infrared, wireless and microwave).

Some embodiments of the present disclosure further provide a computer program. The computer program may be applied to a terminal device or a network device according to the embodiments of the present disclosure, and the computer program causes a computer to perform the method performed by the terminal device or the network device according to the respective embodiments of the present disclosure.

It should be understood that the terms "system" and "network" in the specification are generally exchanged. Further, the terms used herein are for the purpose of describing particular embodiments only and are not intended to limit the present disclosure. The terms such as "first," "second," "third," "fourth," and the like in the specifications, claims and the accompanying drawings of the present disclosure are intended to distinguishing different objects but are not intended to define a specific sequence. In addition, terms "comprise," "include," and variations thereof are intended to define a non-exclusive meaning.

In the embodiments of the present disclosure, "an indication" mentioned in the specification may be a direct indication, an indirect indication, or an association. By way of example, A indicates B, which can mean that A directly indicates B, e.g., B can be obtained by A; can also indicate that A indicates B indirectly, for example A indicates C, and B can be obtained by C; it can also be shown that there is an association between A and B.

In the embodiments of the present disclosure, the term "correspond" may mean that there is a direct correspondence or an indirect correspondence between the two, that there is a correlation between the two, or that there is a relationship between indicating and being indicated, configuring and being configured, or the like.

In embodiments of the present disclosure, "predefined" or "pre-configured" may be implemented by pre-storing a corresponding code, table, or other means that may be used to indicate relevant information in a device (e.g., including a terminal device and a network device), and the present disclosure does not limit the specific implementation thereof. For example, the term "predefined" may refer to "defined in the protocol."

In the embodiments of the present disclosure, the term "protocol" may refer to a standard protocol in the field of communications, and may include, for example, the LTE protocol, the NR protocol, and related protocols used in future communication systems, without limitation.

In the embodiments of the present disclosure, determining B from A does not mean determining B from A alone, and B may also be determined from A and/or other information.

In the embodiments of the present disclosure, the term "and/or" is merely an association relationship for describing associated objects, which represents that there may exist three types of relationships, for example, A and/or B may represent three situations: only A exists, both A and B exist, and only B exists. In addition, the forward-slash symbol "/" generally represents an "or" relationship between associated objects before and after the symbol.

In various embodiments of the present disclosure, the sequence numbers of the above various processes or steps do not denote a preferred sequence of performing the processes or steps; and the sequence of performing the processes and steps should be determined according to the functions and internal logics thereof, which shall not cause any limitation to the implementation process of the embodiments of the present disclosure.

In the several embodiments provided in the present disclosure, it should be understood that the disclosed system, apparatus and method may be practiced in other manners. The above described device embodiments are merely illustrative. For example, the unit division is merely logical function division and may be other divisions in actual practice. For example, multiple units or components may be combined or integrated into another device, or some features can be ignored or not performed. In addition, the displayed or discussed mutual couplings or direct couplings or communication connections may be implemented through some interfaces. The indirect couplings or communication connections between the devices or units may be implemented in electronic, mechanical or other forms.

The units which are described as separate components may be physically separated or may be not physically separated, and the components which are illustrated as units may be or may not be physical units, that is, the components may be located in the same location or may be distributed into a plurality of network units. Some or all of the units may be selected according to actual needs to achieve the objectives of the solutions of the embodiments.

In addition, functional units in the embodiments of the present disclosure may be integrated into one processing unit, or each of the units may exist along physically, or two or more units may be integrated into one unit.

The above embodiments are used only for illustrating the present disclosure, but are not intended to limit the protection scope of the present disclosure. Various modifications and replacements readily derived by those skilled in the art within technical disclosure of the present disclosure shall fall within the protection scope of the present disclosure. Therefore, the protection scope of the present disclosure is subject to the appended claims.

What is claimed is:

1. A method for wireless communication, comprising:
   receiving, by a terminal device, a first message that indicates the terminal device to perform a handover from a first satellite to a second satellite;
   detecting, by the terminal device, a first synchronization signal and a second synchronization signal within a first resource domain and a second resource domain, respectively, wherein the first resource domain and the second resource domain are determined based on first information, the first synchronization signal is associated with the first satellite, and the second synchronization signal is associated with the second satellite, and wherein the first message further includes a first time point at which the first satellite ceases services for the terminal device and a second time point at which the terminal device initiates synchronization with the second satellite, the second time point precedes the first time point; and
   performing, by the terminal device, the handover from the first satellite to the second satellite within a time interval between the second time point and the first time point.

2. The method according to claim 1, further comprising:
   receiving, by the terminal device, assistance information sent by the first satellite, wherein the assistance information is associated with the second satellite and indicates the terminal device to determine the first information.

3. The method according to claim 1, wherein the first information indicates the first resource domain, and the second resource domain includes resources outside of the first resource domain.

4. The method according to claim 1, wherein the first resource domain includes a first time window, the second resource domain includes a second time window, the first information indicates the first time window, and the second time window is determined based on the first time window and a first offset.

5. The method according to claim 4, wherein the first time window is determined based on a synchronization signal block (SSB) measurement timing configuration (SMTC), or the first time window and the second time window are determined based on a synchronization signal block (SSB) measurement timing configuration (SMTC).

6. The method according to claim 4, wherein the first offset is determined based on at least one of the following information:
   propagation delays for the terminal device to communicate with the first satellite and the second satellite, respectively;
   an offset parameter corresponding to the first satellite and an offset parameter corresponding to the second satellite;
   position information of the first satellite and position information of the second satellite;
   position information of the terminal device; or
   movement information of the second satellite.

7. The method according to claim 6, wherein the offset parameter corresponding to the first satellite includes a second offset configured for determining an uplink timing, the offset parameter corresponding to the second satellite includes a third offset configured for determining an uplink timing, and the first offset is determined based on a difference between the second offset and the third offset.

8. The method according to claim 6, wherein the position information of the first satellite and the position information of the terminal device are configured to determine a first direction angle between the first satellite and the terminal device, the position information of the second satellite and the position information of the terminal device are configured to determine a second direction angle between the second satellite and the terminal device, and the first offset is determined based on the first direction angle and the second direction angle.

9. The method according to claim 6, wherein a position of the first satellite at a current time instant is a first position, a position of the second satellite at the current time instant is a second position, and the first offset is determined based on a time taken by the second satellite to move from the second position to the first position.

10. The method according to claim 4, further comprising:
   receiving, by the terminal device, assistance information sent by the first satellite, wherein the assistance information is associated with the second satellite and indicates the terminal device to determine the first information;
   in response to the terminal device failing to detect the second synchronization signal within a second time window, adjusting, by the terminal device, the second time window in accordance with the assistance information associated with the second satellite; and sending, by the terminal device, adjustment information of the second time window to a network device.

11. The method according to claim 1, wherein the first information includes a first carrier and a second carrier, the first carrier is associated with the first synchronization signal, the second carrier is associated with the second synchronization signal, and the first carrier and the second carrier have different subcarrier spacings.

12. The method according to claim 1, wherein the first information includes a first parameter, bits of the first parameter are bitwise inverted to obtain a second parameter, the first synchronization signal corresponds to a first signal index, the second synchronization signal corresponds to a second signal index, and the first signal index and the second signal index are determined by the first parameter and the second parameter, respectively.

13. The method according to claim 12, wherein the first parameter is inOneGroup.

14. The method according to claim 1, wherein in the handover from the first satellite to the second satellite, a physical cell identifier (PCI) of a serving cell in which the terminal device is located is unchanged.

15. The method according to claim 14, wherein the first message includes second information instructs a network device sending the first message to support a handover with an unchanged PCI of a serving cell.

16. A method for wireless communication, comprising:
sending, by a network device, a first message to a terminal device, wherein the first message indicates the terminal device to perform a handover from a first satellite to a second satellite;
wherein a second synchronization signal is associated with the second satellite, a first synchronization signal is associated with the first satellite, a first resource domain and a second resource domain are configured for the terminal device to detect the first synchronization signal and the second synchronization signal, respectively, and the first resource domain and the second resource domain are determined based on first information, and wherein the first message further includes a first time point at which the first satellite ceases services for the terminal device and a second time point at which the terminal device initiates synchronization with the second satellite, the second time point precedes the first time point, and wherein a time interval between the second time point and the first time point is a time interval for performing the handover from the first satellite to the second satellite.

17. An apparatus, comprising:
at least one processor; and
one or more non-transitory computer-readable storage media coupled to the at least one processor and storing programming instructions for execution by the at least one processor, wherein the programming instructions, when executed, cause the apparatus to perform operations comprising:
receiving a first message that indicates a terminal device to perform a handover from a first satellite to a second satellite;
detecting a first synchronization signal and a second synchronization signal within a first resource domain and a second resource domain, respectively, wherein the first resource domain and the second resource domain are determined based on first information, the first synchronization signal is associated with the first satellite, and the second synchronization signal is associated with the second satellite, and wherein the first message further includes a first time point at which the first satellite ceases services for the apparatus and a second time point at which the apparatus initiates synchronization with the second satellite, the second time point precedes the first time point; and
performing the handover from the first satellite to the second satellite within a time interval between the second time point and the first time point.

18. The apparatus according to claim 17, the operations further comprising:
receiving, assistance information sent by the first satellite, wherein the assistance information is associated with the second satellite and indicates the terminal device to determine the first information.

19. The apparatus according to claim 17, wherein the first information indicates the first resource domain, and the second resource domain includes resources outside of the first resource domain.

20. The apparatus according to claim 17, wherein the first resource domain includes a first time window, the second resource domain includes a second time window, the first information indicates the first time window, and the second time window is determined based on the first time window and a first offset.

* * * * *